United States Patent [19]

Chaum

[11] Patent Number: 4,926,480
[45] Date of Patent: May 15, 1990

[54] CARD-COMPUTER MODERATED SYSTEMS

[76] Inventor: David Chaum, 14652 Sutton St., Sherman Oaks, Calif. 91403

[21] Appl. No.: 198,315

[22] Filed: May 24, 1988

Related U.S. Application Data

[63] Continuation-in-part of Ser. No. 524,896, Aug. 22, 1983, Pat. No. 4,759,063, and Ser. No. 784,999, Oct. 7, 1985, Pat. No. 4,759,064, and Ser. No. 168,802, Mar. 16, 1988, abandoned, and Ser. No. 123,703, Oct. 23, 1987.

[51] Int. Cl.$^5$ ............................................. H04K 1/00
[52] U.S. Cl. ........................................ 380/23; 380/24; 380/30; 235/379; 235/380; 235/382
[58] Field of Search ................................. 380/23–25, 380/30, 43, 44, 47, 49, 50; 235/379–382

[56] References Cited

U.S. PATENT DOCUMENTS

| | | | |
|---|---|---|---|
| 4,264,782 | 4/1981 | Konheim | 380/25 |
| 4,393,269 | 7/1983 | Konheim | 380/25 |
| 4,423,287 | 12/1983 | Zeidler | 235/382 X |
| 4,529,870 | 7/1985 | Chaum | 235/379 X |
| 4,590,470 | 5/1986 | Koenig | 380/23 |
| 4,612,413 | 9/1986 | Robert et al. | 380/24 |
| 4,625,076 | 11/1986 | Okamoto et al. | 380/30 |
| 4,656,474 | 4/1987 | Mollier et al. | 235/380 X |
| 4,667,087 | 5/1987 | Quintana | 235/380 |
| 4,697,072 | 9/1987 | Kawana | 235/379 X |
| 4,710,613 | 12/1987 | Shigenaga | 235/380 |
| 4,748,668 | 5/1988 | Shamir et al. | 380/30 |
| 4,757,185 | 7/1988 | Onishi | 235/379 |
| 4,759,063 | 7/1988 | Chaum | 380/30 |
| 4,759,064 | 7/1988 | Chaum | 380/30 |
| 4,782,455 | 11/1988 | Morinouchi et al. | 235/380 X |

OTHER PUBLICATIONS

Chaum, "Design Concept For Tamper Responding System", *Proc. of Crypto* 82, Plenum Press, 1983.
Chaum et al., "A Secure And Privacy Protecting Protocol For Transmitting Personal Information Between Organizations", *Advances in Crytology: Proceedings of Crypto* 86, Springer Verlag Press, 1987.
Elgamal, "A Public Key Cryptosystem And Signature Scheme Based On Discrete Logarithms", *Advances in Cryptology: Proceedings of Crypto* 84, Springer Verlag Press, 1985.
Chaum et al., "An Improved Protocol For Demonstrating Possession Of Discrete Logarithms And Some Generalations", *Advances in Cryptology: Proceedings of Eurocrypt* 87, Springer Verlag Press, 1988.
Rivest et al., "A Method For Obtaining Digital Signatures And Public-Key Cryptosystems", *Communications of the ACM*, Feb. 1978, pp. 120–126.
Rabin, "Digitalized Signatures And Public-Key Functions As Intractable As Factorization", *MIT Technical Report MIT/LCS/TR*-212, Jan. 1979.
Peralta et al., "A Simple And Secure Way To Show The Validity Of Your Public Key", *Proceedings of Crypto* 87, Springer Verlag Press, 1988.

*Primary Examiner*—Stephen C. Buczinski
*Assistant Examiner*—Bernarr Earl Gregory
*Attorney, Agent, or Firm*—Nixon & Vanderhye

[57] ABSTRACT

A user controlled card computer C and communicating tamper-resistant part T are disclosed that conduct secure transactions with an external system S. All communication between T and S is moderated by C, who is able to prevent T and S from leaking any message or pre-arranged signals to each other. Additionally, S can verify that T is in immediate physical proximity. Even though S receives public key digital signatures through C that are checkable using public keys whose corresponding private keys are known only to a unique T, S is unable to learn which transactions involve which T. It is also possible for S to allow strictly limited messages to be communicated securely between S and T.

18 Claims, 9 Drawing Sheets

CARD-COMPUTER MODERATED SYSTEMS

RELATED APPLICATIONS

This application is a continuation-in-part of my prior co-pending applications noted below:
(a) Ser. No. 06/524,896 filed August 22, 1983 and issued July 19, 1988 as U.S. Pat. No. 4,759,063;
(b) Ser. No. 06/784,999 filed October 7, 1985 and issued July 19, 1988 as U.S. Pat. No. 4,759,064;
(c) Ser. No. 07/168,802 filed March 16, 1988, now abandoned; and
(d) Ser. No. 07/123,703 filed November 23, 1987.

BACKGROUND OF THE INVENTION

1. Field of the Invention.

This invention relates to secure transaction systems, and more specifically to configurations and cryptographic techniques for transactions between two subsystems moderated by a third subsystem.

2. Description of Prior Art.

There are essentially three approaches to secure consumer transactions in the known art based on active devices held by individuals. Each of these three has some shortcomings solved by the others, but the techniques are mutually exclusive.

The first, and perhaps most obvious, known approach is based solely on portable tamper-resistant devices, such as are commonly called "IC," "chip," or "smart" cards. The active part of these cards is comprised today of preferably one (but possibly more) integrated circuit(s), typically including input/output interface, memory, and often processing means.

Security from the point of view of the card issuing organization under this approach derives primarily from the tamper-resistance of the card: the individual holding a card is assumed unable to modify or discover the content of some data stored within it. The card issuer should ensure that the logical structure of the card allows only the desired operations to be performed on this protected data. Security often also requires that the instructions requesting (and results of) these allowed operations be securely communicated to (and from) the card. Physically secured communication may be possible when the card is in direct mechanical contact with (or at least quite near) other apparatus trusted by the card issuer. A more attractive basis for secure communication, however, is provided by cryptographic techniques, which make direct contact or even proximity unnecessary. These techniques allow wider use while reducing the trust issuers must have in each terminal device within a system. The basis for security of such cryptographic communication must of course be keys placed within a card's protected storage initially or once otherwise secured communication is established.

Care must also be taken in such systems to further protect issuers and individuals from terminal devices, even once cryptographically secured communication is established between the card and its issuer. This is so because modified or completely bogus terminals might benefit from making improper use of data provided them by individuals (such as, e.g., PIN codes) or from displaying misleading information (such as, e.g., improper amounts of payment) to individuals. Solutions include a keyboard and display on board the card. The keyboard ensures the issuer that input from the individual card holder is supplied securely to the issuer; the display allows the issuer to control messages shown to the individual. These humanly operable input and output means are tamper-resistantly integrated with the secured chip(s), under this first approach. The recently demonstrated Visa/Toshiba "SuperSmart" card, for instance, is programmed to display a transaction code together with the amount of payment, which allows an onlooking shopkeeper (who is assumed able to assess the genuineness of a card) to have confidence that the transaction code will be honored for the amount displayed. (The shop's security would of course be improved if it instead communicated through its own computer.)

One fundamental shortcoming of this first approach is that security derives completely from tamper-resistance. Little has been published on the topic of tamper-resistance of portable computers (but see "Design concepts for tamper-responding systems," by the present applicant, in Proceedings of CRYPTO 82, D. Chaum, R. Rivest & A. Sherman, Eds., Plenum 1983). Nevertheless, the threat level such devices available today can withstand is certainly above that which could be perpetrated without sophisticated tools, but is also almost surely below that of a determined attack by a "national laboratory." Moreover, a security system employing a single such technologically-based countermeasure may be quite vulnerable to unanticipated modes of attack. Such systems can even be a national vulnerability, as evidenced by attacks on consumer payment systems during international hostilities. If payments are to be a major early application of card systems, the above considerations suggest that security which relies on tamper-resistance alone should be considered unacceptable—particularly if each card contains the same master key.

A second intrinsic shortcoming, of this approach based wholly on tamper-resistant devices, is that individuals have no effective way of ensuring the protection of their own interests. Few may regard a large card-issuing organization deliberately cheating them out of money in transactions of modest value as a credible scenario. Nevertheless, it is quite another thing to rule out cheating for economic gain by employees or others who gain access to all or even part of a system. The resulting economic losses to individuals are at least potentially detectable and recoverable. There are other aspects of a system, such as the ability to issue and revoke privileges, whose abuse may be detectable but is not fully recoverable: damage from a personal autonomy point of view is done by the initial denial of access to privileges and cannot be recovered once lost. Other dangers may not even be detectable: much data collected in transactions can be considered sensitive from a personal privacy perspective. Cards might leak such sensitive data directly, or if they reveal universally identifying numbers or the like, much such data could be linked and collected together. Moreover, the privacy related data and the autonomy related decision making power of a system may come under control of an entity with significantly different intentions than that under which the system was originally accepted.

A second known approach to secure transactions is based on apparatus comprising an externally interfaced tamper-resistant part that acts as an intermediary between external systems and a user-controlled workstation. An example of this approach is disclosed in U.S. Pat. No. 4,529,870, titled "Cryptographic identification, financial transaction, and credential device," issued to the present applicant. The difference between the first and this second approach derives from the workstation: it need not be trusted by anyone but the individual. This allows the individual to develop substantial trust in the workstation, because the individual is free to obtain its hardware and software from any source (or even to construct it) and this personal workstation need not have any structure or data that its owner cannot know or modify.

An advantage of such trust in workstations obtainable by individuals is that it allows individuals to directly benefit from the now widely known "public key digital signatures." These can provide, for each transaction, a numerical receipt checkable by the individual's workstation—and also verifiable by any third party arbiter or judge. A comprehensive set of such receipts retained by the workstation can protect many of an individual's recoverable interests. They allow, for instance, ultimately at least a proper settling of accounts.

Other advantages are offered by trustable workstations. One is that they essentially open the possibility for a market in suitable hardware and software. This may be able to meet the needs of individuals more effectively than tamper-resistant devices issued by organizations. Special devices adapted to various user preferences or disabilities are possible, for example, and the latest advances in technology can be employed. Card issuing organizations benefit, since they are freed from the burden of supplying the user interface part and of meeting the demand for its features. The cost of these workstation features are instead shifted to the user, and can in effect be shared between issuer organizations, since a single workstation could even accommodate several tamper-resistant parts.

One thing that cannot be accomplished under this approach, however, is preventing the tamper-resistant part from causing a loss of autonomy by partially disenfranchising or locking individuals out of a system altogether. Such a lockout might even be caused by a covert message or signal sent to the tamper-resistant part during an ordinary transaction, and the possibilities are greatly increased because the tamper-resistant part is privy to all the individual's transaction data. Another fundamental limit on the protections obtainable under this approach, as with the first approach, relates to personal privacy. An individual is unable to effectively ensure that the tamper resistant part does not in some way secretly leak sensitive or identifying information during transactions.

The third known approach may be characterized by the complete absence of a tamper-resistant part: all security derives from cryptographic protocols conducted between an external system and an individual's workstation. Individuals are ensured of protections for their interests, including recoverability, autonomy, and privacy. The shortcomings of this approach, in contrast with the previous two approaches, relate instead to some aspects of security for organizations.

An essential concept of this approach is "blind signatures," as described in European Patent Publication 0139313, titled "Blind signature systems," dated 2/5/85, claiming priority on U.S. Ser. No. 524,896, now U.S. Pat. No. 4,759,063 by the present applicant, which is incorporated herein by reference. In making a payment, for instance, with this approach the individual obtains public key digital signatures through a blind signature process. Each signature might represent the equivalent of one dollar, for example, and would be obtained by and stored in the workstation. When such a signature is released by the individual, the shop receiving it can verify its validity. But the shop cannot be sure that copies of the same signature have not also been given to other shops, in general, without consulting some sort of central registry of accepted signatures. Particularly for low value transactions, the cost of consulting such a directory may be considerable. This problem can be addressed partly by new techniques that compromise the privacy of those attempting to show the same signature more than once, as described in co-pending application of the present applicant, titled "One-show blind signature systems," filed 3/16/88, with U.S. Ser. No. 168,802, now abandoned.

More fundamental (but related) problems occur with digital signatures representing "credentials," which are statements issued by organizations about individuals. Such credentials are obtained by a special cryptographic process using blind signatures and are then presented to gain access to privileges. A problem is that a credential issued to one person for the purpose of allowing that person to gain access to some facility or service might too easily be lent to another person. Indeed, the signature itself might not even be lent, but communication with the (possibly remote) legitimate holder of the credential may allow passable responses to queries by the person wishing to show the credential at the point of access. Further problems may also result if additional credentials are obtained using such a borrowed credential. Some of the credentials so obtained might be "positive," in the sense that it would be in the individual's interest to show them. Thus the lender might improperly benefit from the credentials earned by the borrower. Others of these new credentials might be "negative," in that they would be to the disadvantage of the lender (and thus might inhibit such lending). No matter how such negative credentials are obtained, though, they do raise what may be a fundamental problem: individuals, even if they did initially agree to accept a negative credential, may hide the existence of such credentials (at least for some time) simply by discarding them.

A further limitation of published practical credential mechanisms is that they do not provide the possibility for credentials containing values secret from the individual. Such secrets are used today, for instance, as with some medical records.

OBJECTS OF THE INVENTION

Accordingly, it is an object of the present invention to:

improve organization's security in systems using personal workstations, without diminishing the protections offered to individuals;

improve individual's protections in systems based on tamper-resistance, without reducing the legitimately needed security for organizations;

accomplish the previous objects by providing for cooperation between tamper-resistant parts and personal workstations;

allow a tamper-resistant part to obtain a signature, unobtainable by a workstation, from an external system, without allowing any additional information to be included in or along with the signature;

allow a tamper-resistant part to convince an external system that it has obtained a signature as in the previous objective, without allowing it to leak any additional information;

allow a tamper resistant part a role in creating a private key that gives it knowledge, unavailable to the workstation, which is needed to use that private key, while ensuring that the tamper-resistant part cannot include any secret information in the corresponding public key;

allow a certificate for a public key as in the previous object to be obtained from the external system by the workstation, without the system learning which public key it is certifying, thereby removing the need for universal master keys in tamper-resistant parts;

allow a tamper-resistant part to issue signatures certifying its agreement with certain messages;

allow selection of such messages of the previous object to depend on state maintained by the tamper-resistant part, including information not necessarily in the interest of an individual to retain (such as which one-time-use signatures have already been shown or which pseudonyms or credentials are owned by the individual);

allow proximity of a tamper-resistant part associated with a workstation to be determined by a sensing station;

allow the workstation to ensure that the external system cannot leak messages or signals to the tamper-resistant part in the above transactions;

allow the workstation to ensure that the tamper-resistant part cannot leak messages or signals to the external system in the above transactions;

allow a workstation to permit strictly limited amounts of data to be provided from an external system to a tamper-resistant part, without the workstation being able to learn the content of that data;

allow a workstation to permit a tamper-resistant part to issue strictly limited amounts of data to an external system, without such data becoming accessible to the workstation;

allow the tamper-resistant part to convince the workstation of relationships between such strictly limited data it receives and that which it issues; and allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

BRIEF SUMMARY OF THE INVENTION

In accordance with these and other objects of the present invention, a brief summary of an exemplary embodiment is presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use the inventive concepts will be provided later.

Figure 1:
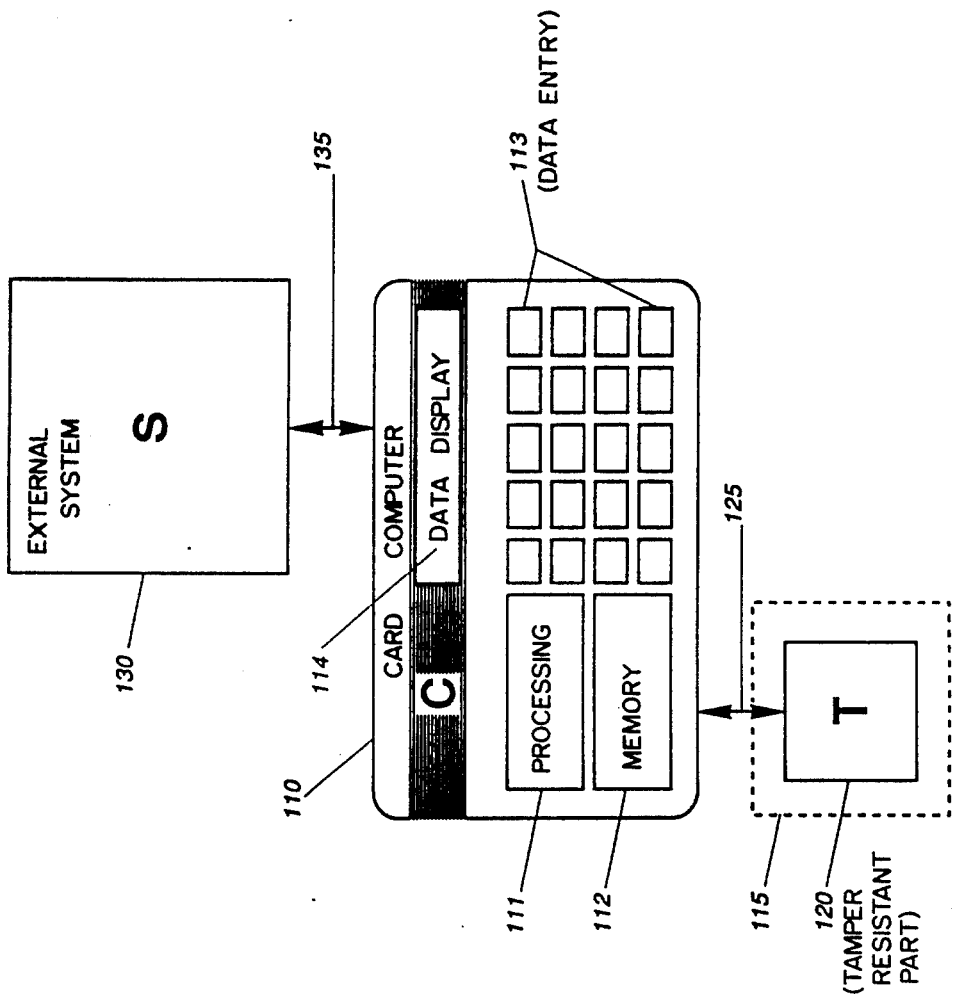
FIG. 1 shows a combination block and functional diagram of a preferred embodiment including a tamper-resistant part, workstation, and external system in accordance with the teachings of the present invention.

A card computer C is held by an individual who can control its internal operation (almost) completely. The individual has a tamper-resistant part T, over the internal operation of which the individual has essentially no control. The individual also conducts transactions with one or more organizations or individuals that may collectively be called the external system S. The physical arrangement is such that all information transferred between T and S must pass through C as is shown in FIG. 1. This gives C the chance to "moderate" such transfers by stopping a transfer altogether, allowing a transfer as requested by T or S, or modifying a transfer before it reaches the other party.

Figure 2:
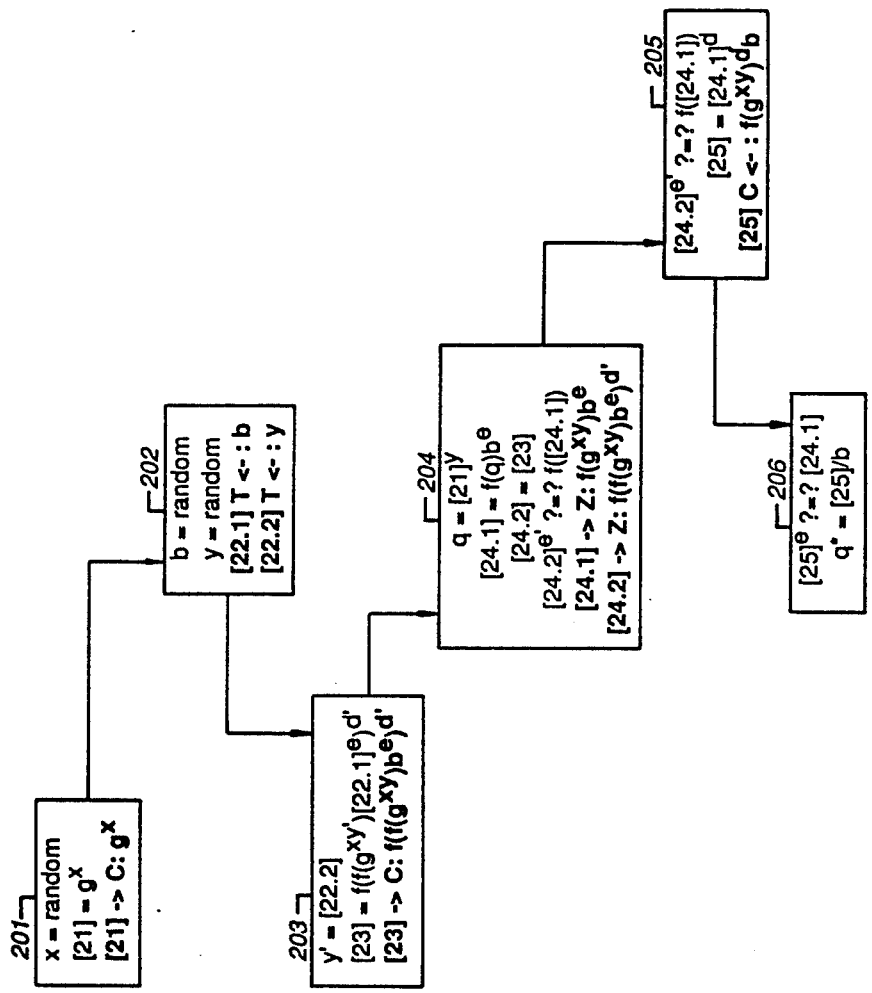
FIG. 2 shows a flowchart of a preferred embodiment of a public key neutralization protocol in accordance with the teachings of the present invention.

A transaction protocol of the preferred embodiment shown in FIG. 2 allows a blind signature to be obtained by C from S. Within the signature is contained, in blinded form, a public key q developed by cooperation between C and T. The ability to form public key digital signatures that can be checked with q is at least in part held by T. Yet, C is ensured that q does not reveal any information chosen by T. Thus, C may be said to "neutralize" a public key created by T and obtain a signed certificate for it.

Figure 3:
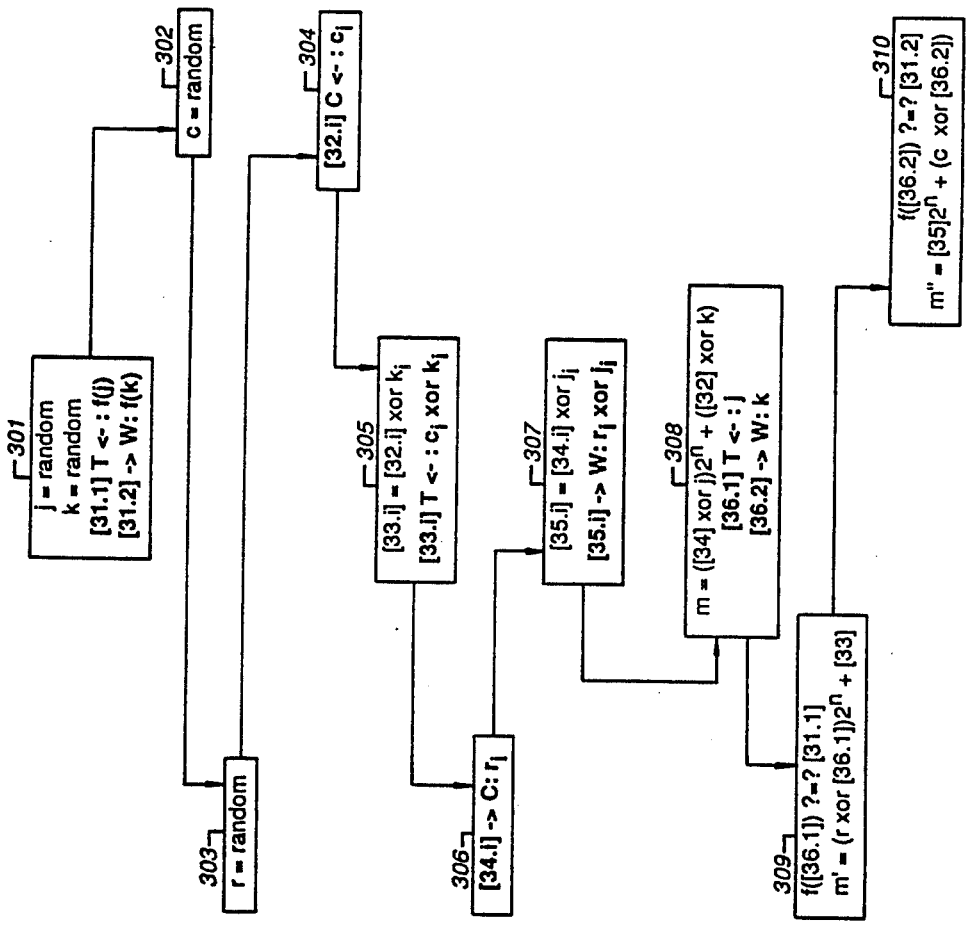
FIG. 3 shows a flowchart of a preferred embodiment of a distance bounding protocol with both outflow and inflow protection in accordance with the teachings of the present invention.

Another transaction protocol, shown in FIG. 3, allows S, T, and C to develop essentially the same value, m, resulting from a challenge response sequence between S and T. The protocol allows C to pad the value of m and the exchanged messages by which it is developed: neither S nor T can influence m (or the messages sent in developing it) in such a way that any information chosen by S or T is revealed to the other of the two. Yet, both S and T are ensured that m results from and is dependent on their respective challenge and response. In developing m, single bits of challenge issued by S are responded to by single bits from T. Because the amount of computation required by the parties to process each such single bit is extremely small, timing by S of the interval between its issue of a challenge bit and its receipt of the corresponding response bit allows S to determine an upper bound on the distance to T.

Figure 4:
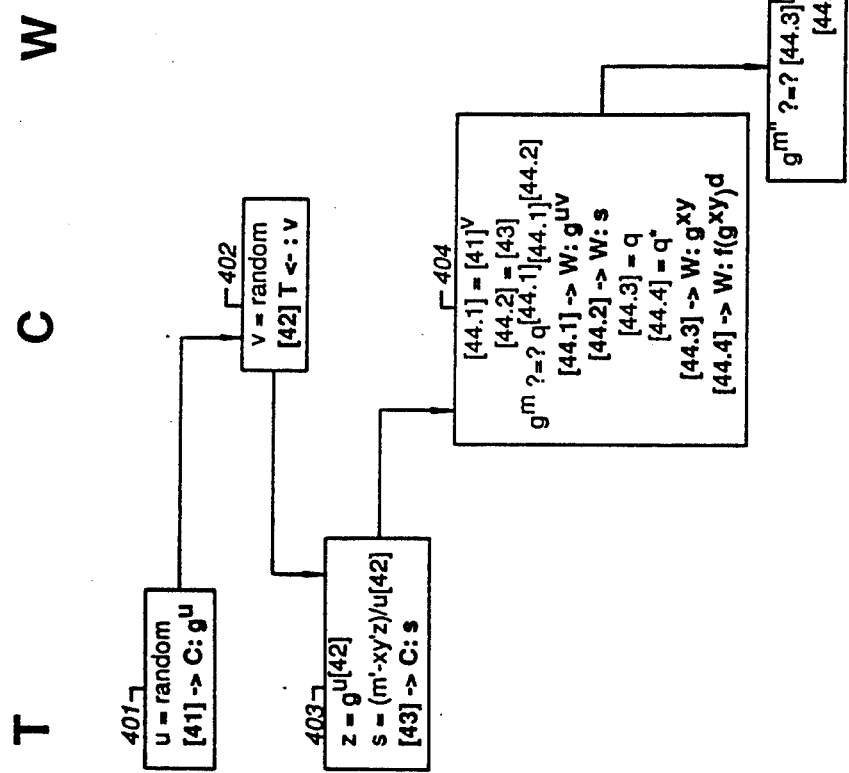
FIG. 4 shows a flowchart of a preferred embodiment of a digital signature protocol with obscuring in accordance with the teachings of the present invention.

A further protocol of the preferred embodiment, shown in FIG. 4, allows T to develop a digital signature on a message, m for instance, using the private key corresponding to public key q. This signature is transferred from T to S by C in a way that allows C to ensure its correctness; the content of the message signed is controlled by T but verifiable by C. Because the result obtained by S is a public key digital signature, S can verify that it was formed by the holder of the private key corresponding to q, and convince any third party of this fact just by showing the signature. The signature is obscured by C to ensure that it does not leak any information from T.

Figure 5:
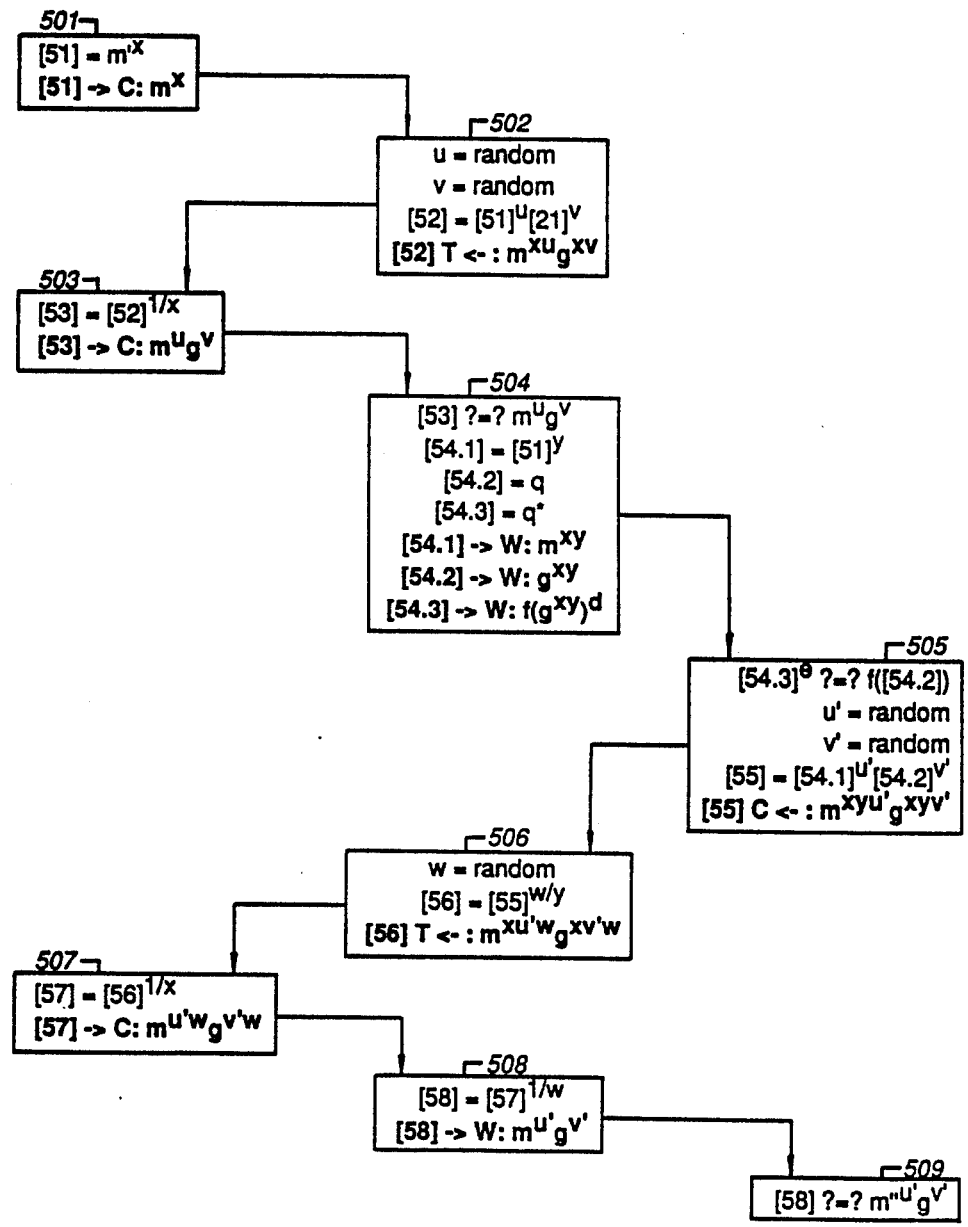
FIG. 5 shows a flowchart of a preferred embodiment of a undeniable signature protocol with disguising in accordance with the teachings of the present invention.

A related protocol of the preferred embodiment, shown in FIG. 5, allows T to show an undeniable signature on a message, also using the private key corresponding to public key q. Undeniable signatures are disclosed in a co-pending application, titled "Undeniable signature systems," with U.S. Ser. No. 123,703, filed 23/11/87, by the present applicant, which is included herein by reference. Such showing of an undeniable signature by T involves S forming a challenge that can be convincingly responded to by T (with all but substantially negligible probability) only if T has formed the undeniable signature properly and participates in forming the response. Such an undeniable signature can be re-shown as often as desired, but only by cooperation of T each time. Again, C is able to ensure that communication between T and S during this transaction is completely disguised, apart from the showing of the undeniable signature.

Figure 6:
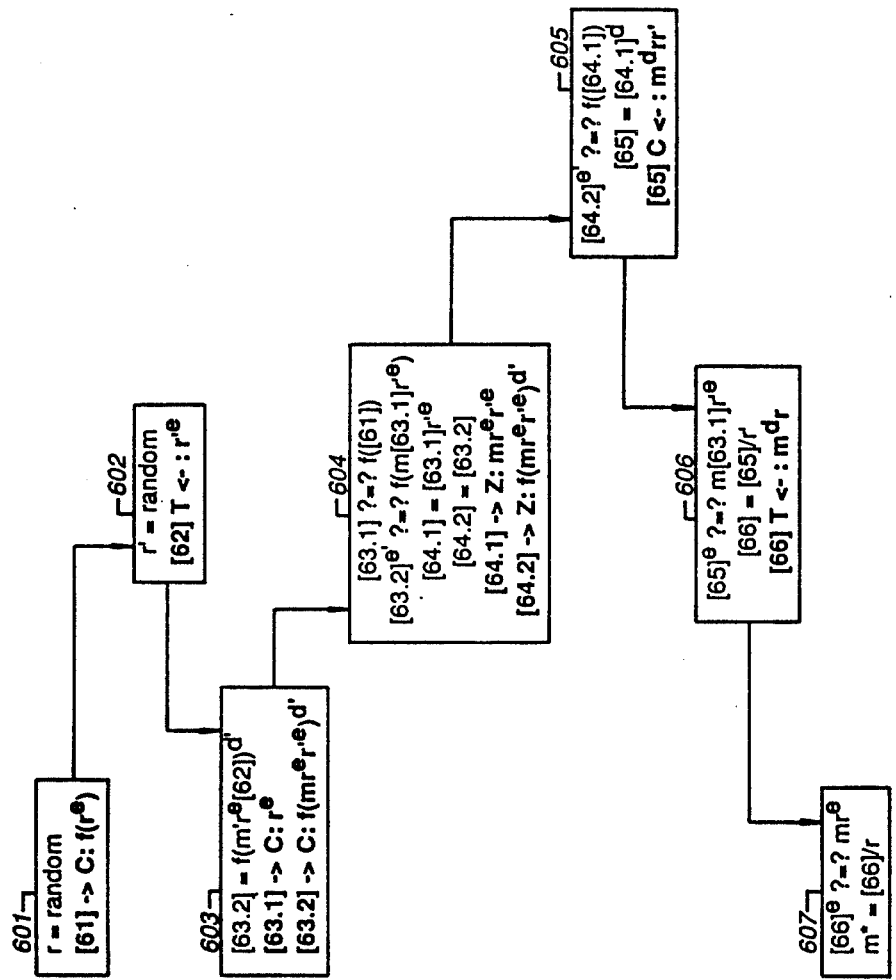
FIG. 6 shows a flowchart of a preferred embodiment of a signature issuing protocol with blinding in accordance with the teachings of the present invention.
Figure 7:
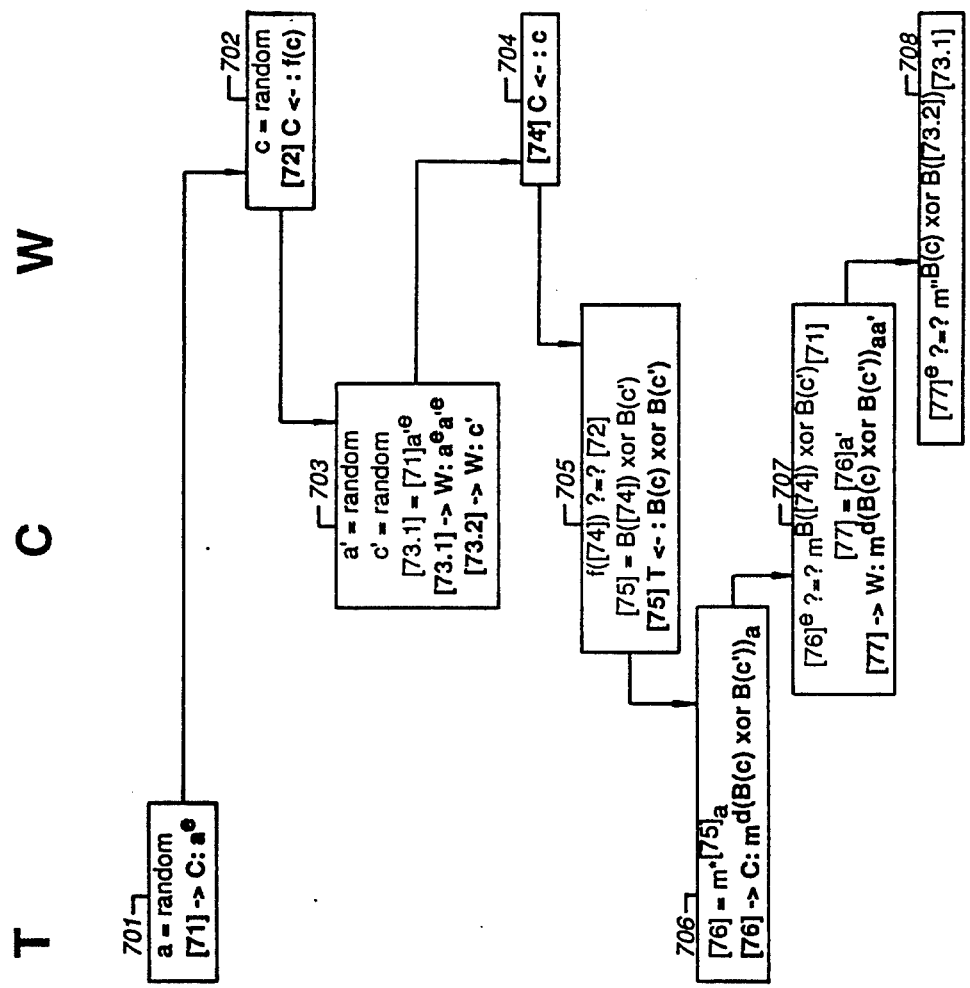
FIG. 7 shows a flowchart of a preferred embodiment of a signature possession showing protocol with sanitizing in accordance with the teachings of the present invention.

A pair of yet other transaction protocols, whose uses are in some sense analogous to those of FIG. 2 and FIG. 5, are shown in FIG. 6 and FIG. 7, respectively. The protocol of FIG. 6 allows T to receive a digital signature from S that is unobtainable by C, but C is able to ensure that only the signature on the desired message is learned by T. The protocol of FIG. 7 allows T to later convince S that it does have the signature of the particular message and is responding to challenges, without allowing C to obtain the signature.

Figure 8:
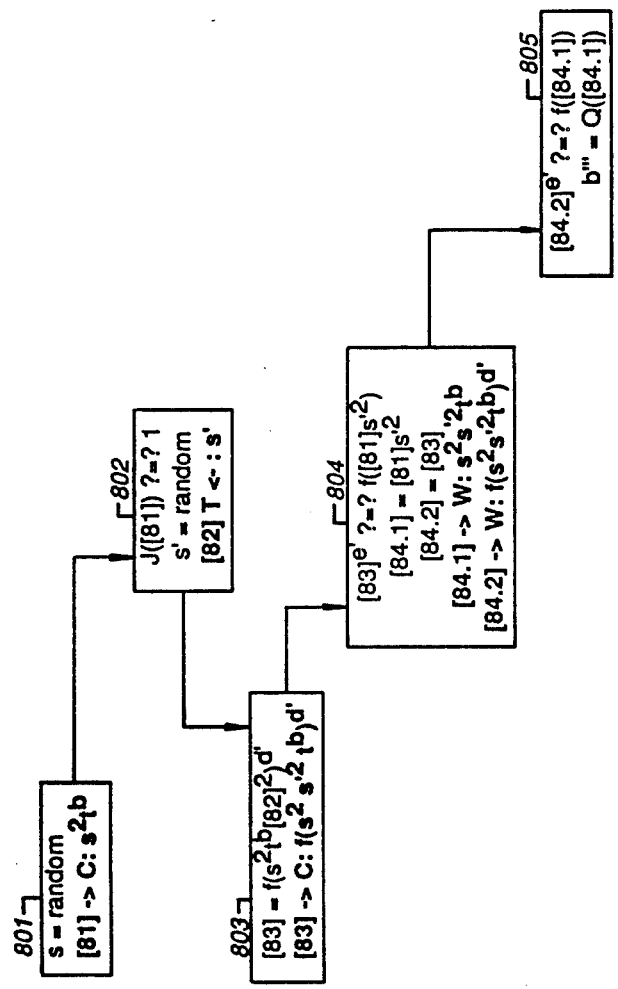
FIG. 8 shows a flowchart of a preferred embodiment of a protocol for a tamper-resistant part providing a single bit to an external system with hiding in accordance with the teachings of the present invention.
Figure 9:
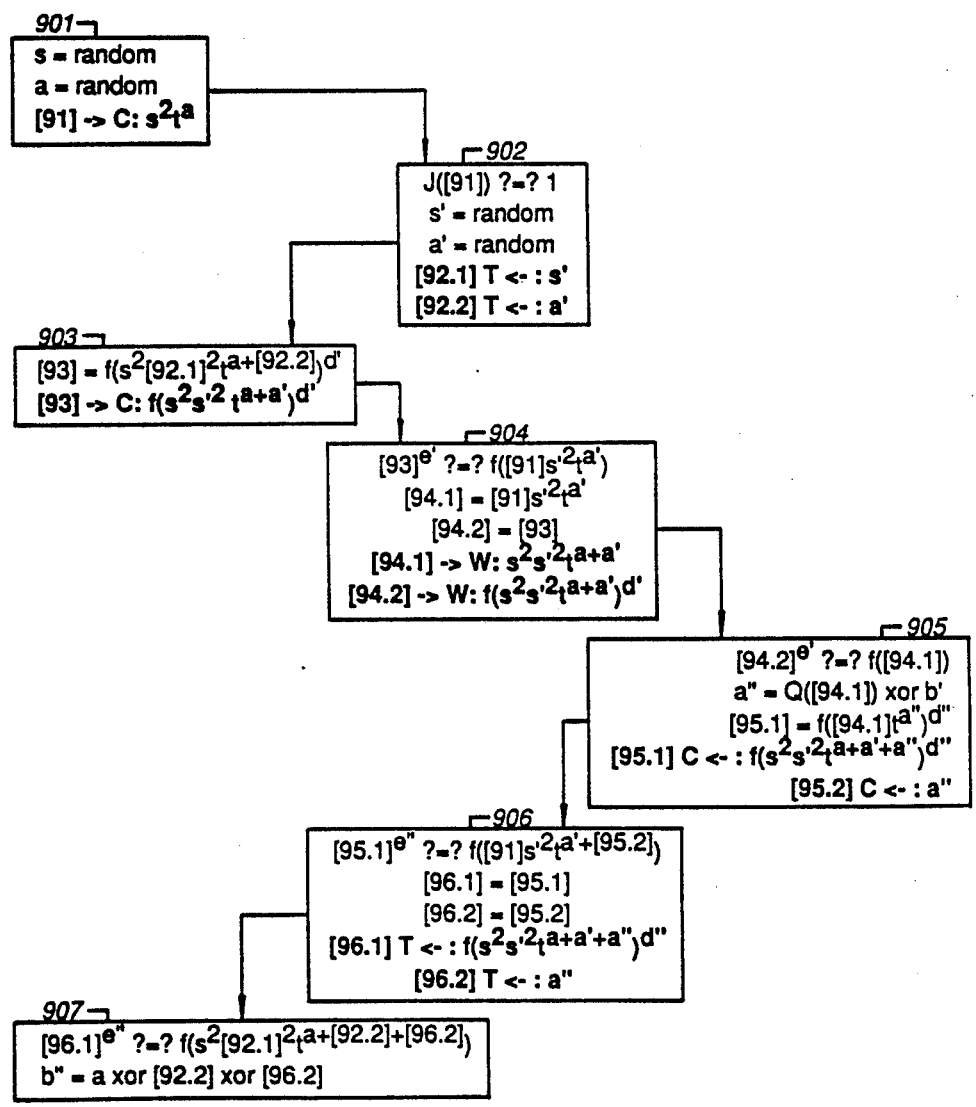
FIG. 9 shows a flowchart of a preferred embodiment of a protocol for a tamper-resistant part receiving a single bit from an external system with modifying in accordance with the teachings of the present invention.

Yet another pair of transaction protocols shown in FIG. 8 and FIG. 9 allow the transfer of a single bit from T to S, and from S to T, respectively. Bits transferred in this way are unlearnable by C, but C is able to ensure that no more than only a single bit is transferred.z

GENERAL DESCRIPTION

Turning now to FIG. 1, a general description of the present invention will be given.

Block 110 represents a "card computer" C. It contains processing means 111, memory means 112, data entry means 113, data display means 114, all interfaced by suitable means not shown for clarity, such as are well known in the art, and two communication interfaces to be described. The card computer C might be the size of a current credit card, for example, and include buttons as data entry means 113, and LCD dot matrix display as data display means 114, and the communication interfaces to be described might be by direct electrical connection-all as currently known in the art. (Of course any suitable technologies for accomplishing these functions may be used.) It is anticipated that such card computers may be given to individuals by organizations, sold freely to individuals by a variety of vendors, and/or may serve other functions for individuals not limited to transaction system use, like those of general purpose small computers or workstations. As will be appreciated, C might also be any computer of any ownership or use. For clarity in exposition, however, C will be said to be held or owned by an individual that will use it in transactions.

It may be that C contains parts that are in general difficult for its owner to examine or modify, but the security for organizations against abuses that might be perpetrated against them by the individual holding C should not rely on this tamper-resistance. For example, it is anticipated that part of C may include memory elements whose contents must be changed if C is to be useful to a different person. Another example is memory elements that are not usually readable, unless some pre-arranged PIN code, biometric, or the like is entered; such arrangements might protect the holder's data from inspection by someone else coming into possession of C. While such tamper-resistance does prevent the holder from certain accesses and may provide improved security for individuals, and indirectly for organizations, the security of organizations against abuses by individuals does not rely on it, and it primarily acts as a protection of the owner against other individuals.

Tamper-resistant part T 120 is an information processing device, perhaps a general microcomputer. It derives input from interface 125 that is provided by C 110 and provides output through interface 125 to C 110. It is intended to at least maintain some secrets from the individual who holds it and to have at least some structure that is unmodifiable by the individual, that which at least prevents the individual from making some accesses to the secrets it contains. These secret values need not be explicitly stored in ordinary memory elements; they may be encoded in the structure of T in some other way, possibly in efforts to keep them more securely from individuals. Some of the secrets of T may of course be stored in encrypted form by C.

It is anticipated that Ts might be supplied by organizations to individuals. One way this might be accomplished is by direct issue of one. T selected by an organization to a specific individual. Another issuance procedure, which may have advantages to individuals, allows the individual to choose between a plurality of Ts, perhaps even in a way that prevents the organization from learning which individual has obtained which T. A further possibility is that Ts might be rather freely distributed. As already mentioned, T need not be used in personal transaction systems.

It is anticipated that a T 120 may have some way of ensuring its own association with a particular person. One way this might be accomplished is for T to include means to determine the physical identity of a person, such as a fingerprint reader or other so-called biometric means, as already mentioned, that may be known in the art. Another possibility, though perhaps not a very pleasant one, is that T, or some part of T, may be embedded within the person, possibly under the skin, such technologies being known in the art. Any such techniques may provide additional security for organizations, and may also be to the advantage of individuals, since use of their Ts by other individuals may be limited in this way.

External system S 130 is an information processing system not under control of the individual. It might, for example, be a shop's point of sale system, a counter at a bank or other institution, or some informational facility accessed remotely by telecommunications or the like. The interfacing part or deeper parts of external systems may be regarded as S. System S 130 takes input from interface 135 connected to C 110 and provides output to this interface 135 that becomes available to C 110. In the descriptions of the preferred embodiment S includes two entities Z and W.

While FIG. 1 shows only a single T, C, and S, it is anticipated that a plurality of each may be used, even by the same individual. For example, one person may have several Cs, one for everyday use, one for special occasions, and a small computer at home or work may sometimes also serve as a C. Also, there might be several different kinds of possibly cooperating Ts, each issued by a different organization, for example, one for payments, one for private sector credentials, and one for government credentials. Other applications might involve Ts embedded in other apparatus, such as television receivers or automobiles. In such uses, a T might have control over a critical function of a device, such as a television set, and/or sensors providing it data about things beyond its confines. Whereas there need not actually be a plurality of different organizations operating disjoint external systems S, individuals should have the ability to transact as part of at least two different accounts between which unlinkability may be provided. Of course there might be a single communication carrier who provides part of the transaction system used to connect to other organizations, or there might simply be more than one different transaction system. Also, the Cs of two or more individuals may transact among themselves, in which case each individual or their C may be considered to double as an S.

A preferred protection C should be able to have against T is that against "outflow": T should not be able to leak any pre-arranged message or message of T's own construction through C to S. For example, as was mentioned, if T were able to leak information identifying itself to S, then the privacy protections of blind signatures would become ineffective. This does not, however, imply that T cannot influence the output of C to S, as will be seen.

A second protection C may wish against T is that against "inflow": T should not be able to receive any pre-arranged or otherwise recognizable message or signal from S that is unrecognizable by C. For example, S might send such a message to T requesting that if T is a particular T or member of a particular class of Ts and/or has memory contents that satisfy certain conditions, then T should temporarily or even permanently go out of service. For one thing, this might allow S to determine the identity of T, since C's inability to perform a subsequent transaction requiring the assistance of T might confirm S's guess that a particular T is involved. But other possible uses of such inflow would discriminate improperly against some people. Protection against inflow also does not imply that T not receive anything that depends on the output of S, as will be seen.

Such protections against inflow and outflow may be supported by some electromagnetic shielding or isolation 115. For instance, T might be enclosed within some physical structure that prevents it from emanating signals or from receiving signals, except those provided through interface 125. One arrangement for achieving this conveniently might be for T to be contained within such a suitably protective part of C. Naturally, interfaces 125 and 135 must be such that manipulation of them by T and S should not allow any sufficiently detectable signal to be passed through to the other side of C without cooperation of C. Thus, some sort of isolation might be desired, such as what might be provided in interfaces 125 and 135 were to be isolated optical interfaces. Various such suitable shielding and isolation techniques are well known in the art.

The physical isolation between T, C, and S need not be strictly as shown: more permissive arrangements would still remain within the scope of the present invention, as will be appreciated, and they are not believed to make an essential difference for the protections retained. A simple illustrative example, where only outflow protection is required, is a one-way channel allowing S to transfer information directly to T. Because of the symmetry of the situation, a channel only allowing T to transfer information directly to S need not violate inflow protections. For simplicity in exposition, and because of this symmetry, it will be appreciated that the case of two communicants, A and B, with moderator C can be considered without loss of generality, and that by substituting T and S for A and B, in possibly different ways, various more permissive anticipated configurations can be arrived at.

A one-way channel from A to B, which includes the previous two cases, may be monitored or controlled by C. Monitoring may be with or without notification to A and/or B, with or without consent of A and/or B, or it may be limited by other properties, such as the nature of the transaction or amount of data transferred. Control by C over use of such a channel may be by, for instance, limiting the times and/or amounts of data transferred. An ability to monitor and control gives a kind of censorship, and when this is combined with some delay on the channel, transfer of even a single improper bit can be prevented. Furthermore, C may have the ability to interject messages on the channel. This may be subject to constraints, such as on the amount or timing of such interjections, priorities between interjections and authentic messages, and requirements that interjections be made known to A and/or B some time after they have been perpetrated.

Another example, which does not exclude simultaneous use of the previous cases, is for A to have some abilities with respect to the channels between C and B. For instance, A might be allowed to listen in on what C says to B or what B says to C. The various possibilities mentioned above related to monitorability, control, and interjection would also apply here, but, instead of C accessing a channel between A and B, A would access a channel between B and C.

A third preferred protection, this time for S, is the ability to determine the physical distance to T. An example of when S might wish to do this would be when C is being presented at a counter, access point, terminal station, or the like by a person who should be holding the appropriate T along with C. The ability to verify this can discourage someone from lending parts of their credentials or the like to other persons, since this would now mean also the lending of T, which might be unattractive to individuals for several reasons. One is that the lending of T would have to be physical, and could not just be carried out by telecommunications, as with lending only information or just providing needed responses. Also, when T is physically lent, the owner of T would be unable to make further transactions until T is returned. Furthermore, T might be designed in such a way that if it were given to someone along with the passwords or the like necessary to use it for even the smallest thing, then that person might be able to make virtually unconstrained access to T, thus requiring a great deal of trust for such lending.

Well known in the prior art are techniques where a random challenge is broadcast by a first party and the time interval until a reflection of it is heard by the first party is measured to determine the distance to the point of reflection. An inherent limitation in all schemes that measure elapsed time is of course that, where delay can be introduced, the calculated distance is increased and only an upper bound on the true distance is obtained.

Challenge response techniques form a basic part of many cryptographic protocols known in the art. Typical examples are protocols where one party seeks to confirm that the other party with whom communication is taking place is actually the holder of a secret key. Such a protocol might be initiated by the first party sending a random challenge to the second party, who is then to return an encryption of the challenge using the secret key. If conventional cryptography is used, then both parties would typically share this key, and the first party could use it to encrypt the challenge and verify that the result is identical to what was supplied by the second party. If public key digital signatures are used, then the second party would sign the challenge using its secret signing key and the first party would verify the signature using the appropriate public key. Variability in the time required to compute a cryptographic function applied to a challenge may be large compared to the accuracy of distance measure required, which is one reason such techniques may not be preferred for the present problem.

If one wishes to determine the distance (or an upper bound on it) to a secret key's holder such as T, then neither known technique is suitable: possession of secret keys is clearly unnecessary to reflect a signal; a challenge should be generated by S, but this cannot be made known to T without compromising the inflow property; and computational requirements might significantly reduce the accuracy of such distance measurements. A solution is illustrated by the preferred embodiment of FIG. 3.

Some example applications of the herein disclosed inventive concepts will now be presented to illustrate some particular uses, but such a listing is only intended to be suggestive and not limiting in any way.

One example use might be for simple untraceable payments. For each dollar withdrawn, a separate neutralized public key certificate might be issued by the techniques of FIG. 2, with a bank playing the role of Z. When payment is later made to a shop, a certificate from the withdrawal is issued by C and the techniques of FIG. 4 are used to issue a corresponding signature on such things as the date and name of the shop W. Every T would be programmed to issue only one such signature per certificate (which is an example of the already mentioned object of the invention related to state maintained by T). If the signature and certificate are valid, then the shop knows that this dollar cannot be spent at any other shop—unless the tamper-resistance or cryptography have been compromised. The shop also has a signature and corresponding certificate showing that it has received the dollar, and these can be verified by the bank or any other party. The unlinkability of the protocol of FIG. 4 makes such payments untraceable to the payer's account.

A second example is credential mechanisms, which were already mentioned. A simple way to handle credentials, using the present inventive concepts, is for T to know what credentials its holder has received (as statements signed by organizations), and for T to sign statements requested by C that T checks are true based on the credential data it maintains. For each relationship an individual has with an organization, a different public key, called a digital pseudonym, is used. A public key certificate would be created for each pseudonym by the techniques of FIG. 3, and one of these would be shown by C in establishing each relationship. Physical presence may be required for obtaining and/or using credentials; thus, the techniques of FIG. 2 may be employed to allow T to show its proximity and ability to make signatures corresponding to a particular pseudonym.

A third example is when T is used to decode data signals, such as television or radio programming disseminated by broadcast, cable, or satellite. The data might be encrypted so that secret keys are needed to obtain it in the clear, and these keys may change periodically and/or be different for different parts of the data. Distributor organizations, such as television stations, might sell or otherwise issue keys allowing access to this data. As with credentials, a T may be known under different pseudonyms for different relationships with distributor organizations. A distributor provides a key to a T simply by using public key distribution techniques, as are well known in the art. For example, a public key certified by the techniques of FIG. 2 can be used as T's contribution to a Diffie-Hellman key exchange, with the contribution of the distributor being provided to T by C. This would establish a key known to both T and the distributor, but not to C. This key can then be used to decrypt possibly other encrypted keys, and thereby ultimately lead to the keys used to encrypt the data itself.

Another example is the one-show blind signatures used in payments, as already mentioned. They rely on signatures being of a special form. One way to guarantee such a form would be for Ts to simply check this form before issuing a signature on it using the techniques of FIG. 4. A possibly more secure approach would be for C and the bank to conduct the protocol outlined in the referenced application (titled "one-show blind signatures"), but with the bank requiring each message received from C to include a validating signature made by T. Such a signature would be provided only after T checks that the messages are properly formed, possibly by constructing them itself (as illustrated, e.g., in FIGS. 2 or 6.). Somewhat more security might be achieved by using the embodiment of FIG. 6 to let T obtain the final signature from the bank, since that way C would have to rely on T to show the signature by the techniques of FIG. 7, and T would only do this once. As will be appreciated, such techniques differ from the previous three examples in that all security cannot be compromised merely by compromising T's tamper-resistance: the cryptographic techniques of the referenced protocol would also have to be broken to violate its security properties.

Credential protocols have been detailed in "A secure and privacy protecting protocol for transmitting personal information between organizations," by the present applicant and J.-H. Evertse, in Advances in Cryptology: Proceedings of CRYPTO 86, A. M. Odlyzko, Ed., Springer Verlag, 1987. Such protocols could also benefit from T checking and signing each message to be sent to an organization. In these protocols (and more generally in any protocol to be handled in this way), when the individual is called upon to create random values, the well known cryptographic "coin-tossing" techniques for creating "mutually trusted random values" could readily be applied between T and C (as, e.g., in FIG. 6). When a public key is required to be created by the individual, the techniques of FIG. 3 could be applied, thereby making cooperation of T necessary in forming signatures that the protocol allows the individual to form (or in receiving secret information the protocol allows the individual to obtain). Such public keys can be built into the "validaters" of the credential protocol referenced. Whenever organizations sign public keys created by such techniques, signatures need not be kept from C, since cooperation of T is required to use the signatures.

Some general descriptions of the preferred embodiments of FIGS. 2 through 9 will now be given to further their more general appreciation. In these descriptions, the flowchart boxes and messages shown in FIGS. 2 through 9 are referenced for clarity; but since these figures are not described in detail until the next section, references to them will be enclosed in parenthesis here and will not be identified as such each time they appear.

The flowchart of FIG. 2 may be considered in a setting where T and Z each initially have a private key and where the corresponding public keys are known to all three parties. In the preferred embodiment, a public key created by cooperation of T and C is to have a private key known at least in part only to T and is to receive a blind signature from Z. The cooperation between T and C to form a new public key (the part of the figure occupied by box 201 and parts of 202 and 203) is shown in the following exemplary way: T creates a public key (part of box 201), C creates a "neutralizing" value (box 202), and the two are combined to form the neutralized new public key by T (part of box 203) and C (part of box 204). The protocol to obtain the blind signature on the new public key (the part of the figure occupied by boxes 204, 205, 206, and parts of 202 and 203) begins by C creating a "blinding" value, as are disclosed in the already referenced publication titled "blind signature systems." This value is used to form a blinded message that includes the new public key as original message by T (part of box 203), who signs this with its private key, and also by C (part of box 204) in checking this signature with T's public key. After Z also checks this signature with T's public key, Z signs the blinded new public key (box 205). The result is checked and unblinded by C (box 206).

The flowchart of FIG. 3 may be considered in a setting where T has a private key and the corresponding public key is known to both C and W. In the preferred embodiment, a challenge and response sequence should allow W to determine an upper bound on the distance to T. The challenge created by W (c in box 302) is substantially unpredictable to at least C; the response created by T (r in box 303) is substantially unpredictable to at least C. To prevent inflow, the challenge may be "padded" by being exclusive-or'ed with a pad (k in box 305) chosen and committed to by C (part of box 301) to W and at least unknown to T and unpredictable to W; to prevent outflow, the response of T may be similarly padded by being exclusive-or'ed with another pad (j in box 307) chosen and committed to by C (part of box 301) to T and at least unpredictable to T and unknown to W. Each bit of challenge is in turn issued (box 304), padded, responded to (box 306), response padded, and returned to S. After the stream of challenge bits is completed, commitments to the pad(s) are opened by C (part of box 308), and all parties compute the common result (m in box 309, 310 and part of box 308). As will be appreciated, the problem mentioned above related to the amount of processing time is solved adequately for practical applications, since only a few exclusive-or's are required, or some other cyclic group operation for instance. As will also be appreciated, one or both of the padding operations may be omitted, simply by using the protocol shown with the undesired pad(s) set to zero. It would of course be more elegant to leave out the corresponding commit to an unused pad (message [31.2] or [31.2]) as well as the superfluous exclusive-or operations (of boxes 305, 307, 308, 309, and 310) and opening messages ([36.1] and [36.2]). The post authentication, though not shown in this figure for clarity, would entail a digital signature being formed by T and shown to S and is described as well as shown for general use in FIG. 4 for instance.

The flowchart of FIG. 4 may be considered also in a setting where T has a private key and the corresponding public key is known to both C and W. In the preferred embodiment, a signature issued by T on a message (m) is to be obtained by W. The signature is created by T (boxes 401 and 403). As will be appreciated, the signature could require cooperation of both C and T to form, but this is preferably achieved by two separate signatures, one of the type shown here and the other created by C using a private key it alone knows. The signature is checked by C (part of box 404) and then forwarded to W, where it is checked again (405). The embodiment shown includes creation of an "obscuring" value by C (box 402) that should not be known to T or W. Then C uses this value in obscuring the signature while checking it (part of box 404). As will be appreciated, less perfect obscuring may also be used, such as that which is only computationally difficult to remove or otherwise less than optimal. Some signatures are self-obscuring, in the sense that there is exactly one signature corresponding to any particular message, when the public key is fixed. Other signature schemes, like the so called ElGamal signature scheme (disclosed in "A public key cryptosystem and signature scheme based on discrete logarithms," Advances in Cryptology: Proceedings of CRYPTO 84, G. R. Blakley and D. Chaum, Eds., Springer Verlag, 1985) do not have this property: there may be many different signatures for the same pairing of message and public key. Since the kind of signature scheme relied on in FIG. 4 resembles the ElGamal, special measures have been taken to obscure the signature.

The flowchart of FIG. 5 may also be considered in a setting where T has a private key and the corresponding public key is known to both C and W. In the preferred embodiment, an undeniable signature on a message (m) is issued by T and should be verified by C and then by W. Initially, T forms the undeniable signature (box 501) and C issues a challenge appropriate for such signatures (box 502). Then T responds to the challenge (box 503) and C verifies the response (box 504). (Note that the use of y by C in boxes 504 and 506 could also have been done by T as part of the signing and responding of boxes 503 and 507.) The signature is then supplied to W, who issues a challenge (box 505). This challenge is "disguised" by C (box 506). Disguising a challenge means changing it, responsive to a disguising value that is unknown to T, and then undisguising the response, in such a way that: (i) the disguising is transparent to the challenge/response process in the sense that it does not interfere with the checks of W, and (ii) for each particular challenge W could provide, there is a disguising value that would transform it into any other disguised challenge. Of course, such disguising need not be optimal, and could be based on computational infeasibility or otherwise imperfectly hide some information about the challenge. The disguised challenge is responded to by T (box 507) and this is "un-disguised"—that is, C removes the influence of the disguising value (box 508). As will be appreciated, the disguising is believed to prevent outflow, and could thus be omitted in some embodiments. Finally, W verifies the undisguised response (box 509).

The flowchart of FIG. 6 may be considered in a setting where T and Z each have a private key and the corresponding public keys are known to all three parties. In the preferred embodiment, a signature issued by Z on a message (m) is to be obtained by T but kept from C. The message is blinded doubly: part of the blinding is created by T (601) and the other part by C (602). The resulting doubly-blinded form of the message is signed by T (603) and then checked by C (604). The doubly-blinded form is then signed by Z (605) and the result checked by C (606). The fully unblinded form of the signature is developed by T (607), since only T is able to remove at least part of the blinding. It will be appreciated that it is not essential, for instance, whether C places and/or removes its own blinding or whether it allows T to do so.

The flowchart of FIG. 7 may be considered in a setting where T has a signature verifiable with some public key known to all three parties. In the preferred embodiment, by issuing a challenge and checking the response, W should gain confidence that a party holding a signature on a particular message (m) participated in forming the response after the challenge was issued. A "protector" value ($a^e$) is created by T in such a way that T knows the signature on the protector value (box 701). This protector value is "sanitized" by C combining it with a sanitizing value ($a'^e$) in such a way that substantially any sanitized protector results from any protector, for some sanitizing value (part of box 703). Also, the sanitizing value is at least unpredictable to the two parties, which is believed to prevent outflow. The sanitized value is provided to W (message [73.1]). A mutually-trusted challenge value is created by a suitable cryptographic coin-toss technique between C and W, such as are widely known in the art: one party commits to a part (C in box 702), the other supplies a part (W in part of box 703), and the first party opens the commit (box 704), thereby letting both parties compute the output as a group operation applied to the two parts, which are elements of a cyclic group (parts of boxes 705, 707 and 708). Once the sanitized protector is committed to and the coin-toss result is known, C and T can form the response. The preferred embodiment accomplishes this by passing the challenge from C to W (part of box 705); computing the response without knowledge of the sanitizing value by T (box 706); and C sanitizing the response (part of box 707). As will be appreciated, the sanitizing value could be provided to T who could then perform the entire response formation; but this should involve at least some commit by C to the sanitizing value before learning the protector. It is anticipated that the widely publicized Fiat-Shamir style challenge and response could also be employed, as would be obvious to those of skill in the art; a single signature and corresponding term in the response are shown here for clarity, but any number of such terms could of course be included. Finally, W checks the response (part of box 708). Another example variation anticipated, and that would be obvious to those of skill in the art, is simply using "discrete log" techniques instead of RSA signatures, as described in part in "An improved protocol for demonstrating possession of discrete logarithms and some generalizations," by the present applicant, J. H. Evertse, and J. v. d. Graaf, in Advances in Cryptology: Proceedings of Eurocrypt 87, D. Chaum and W. L. Price, Eds., Springer Verlag, 1988.

The flowchart of FIG. 8 may be considered in a setting where T and W each have a private key and the corresponding public keys are known to all three parties. In the preferred embodiment, a message (b) is known to T and should be provided to W, but should be kept secret from C. The message is from a strictly limited set of messages (square or non-square) and is initially "encoded" (box 801) by being encrypted using the public key of W (the modulus used in box 801). This encoded value is then "hidden" by a value (s') chosen by C and which is at least not known to T in advance (box 802); such hiding potentially changes the encoded form of the message to any other encoded form of the same message, depending on the value used, but it does not change the message itself. Of course, less than perfect hiding could be used. The hidden form is signed by T (box 803) and the signature is checked by C (box 804). The signature is also checked by W (805), who is able to use the corresponding private key to determine the actual message sent by T.

The flowchart of FIG. 9 may be considered in the setting where T and W each have a private key and the corresponding public keys are known to all three parties. In the preferred embodiment, a message (b') is known to W and should be provided to T, but it should be kept secret from C. The message is chosen from a group (squares and non-squares modulo a composite). A group element is chosen by T in a way preventing C from learning it, and it is encoded (encrypted) using the public key of W (box 901). This choice of encoded message is "modified" by C creating a second message known to contain a second group element and combining the two in such a way that the result is known to contain the group element resulting from the group operation applied to the two original group elements (box 902). The combination is also such that it can yield any resulting modified encoded message for some modification, but a suitable approximation of this may also be acceptable. A signature on this modified encoded message is formed by T (box 903) and checked by C (box 904). Then W also checks the signature; determines the group element in the modified encoded message; finds a counteracting group element (a") that combines by the group operation with the group element in the encoded message to yield the actual message W wishes to send; forms a digital signature that reveals the counteracting group element (messages [95.1] and [95.2]); and provides this signature to C (box 905). This signature is checked by C before forwarding it to T (box 906); also forwarded is the group element used in the modifying, which could of course have been forwarded after T commits to its initial encrypted message. Finally, T checks the signature and then recovers the message sent by W as the group operation applied to the element it chose, the one known to C, and the one revealed by W's signature (box 907).

DETAILED DESCRIPTION OF PREFERRED EMBODIMENTS

While it is believed that the notation of FIGS. 2–9 would be clear to those of ordinary skill in the art, it is first reviewed here for definiteness.

The operations performed are grouped together into flowchart boxes. The column that a box is in indicates which party performs the operation defined in that box. The columns are labeled by party name across the top. Some operations show how messages are formed on the right of the equal sign with the message number (shown in square brackets) on the left of the equal sign. The operation of saving a value under a symbolic name is denoted in the same way as that of forming a message, except that the symbolic name appears on the left instead of a message number. Another kind of operation is an equality test. The "?=?" symbol is used to indicate these tests, and the testing party terminates the protocol if the test does not hold. (If the test is the last operation to be performed by a party during a protocol, then the success or failure of the test determines the party's success or failure with the protocol.) The final kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression fully denoting the actual value of the message that should be sent, possibly expressed using variables whose values may not be known to the sender.

Several kinds of expressions are used. One is just the word "random." This is used to indicate that a value is preferably chosen uniformly from an appropriate interval over the integers, defined in the text, and independently of everything else in the protocol. Thus a party should preferably employ a physical random number generator for these purposes, possibly with appropriate post-processing. In practice, however, well known cryptographic and pseudo-random techniques may be applied possibly in combination with physical sources.

Another kind of expression involves exponentiation. All such exponentiation is in a finite group, often preferably in the group of residues modulo an integer, the integer being specified in the text for clarity. When no operation is shown explicitly, multiplication in such a group is assumed. When "/" is used, the multiplicative inverse is first calculated for the expression on the right and then this is multiplied by the expression on the left. The results of all such operations on group elements are assumed for convenience and clarity to be encoded as a binary number (the least positive representative is preferable when the elements are residue classes).

The function f is a preferably publicly agreed one-way function, such functions being well know in the art. It may be assumed to have a domain able to include the result of the largest group operation and a range small enough to be represented in any such group. It may also have some "hard" bits, as are well known in the art, there desirability as will be indicated more specifically later.

Addition and subtraction over the integers are used and mentioned in the text. The exclusive-or operation, sometimes called addition modulo 2, is denoted by the infix operator "xor," and is used for single bit arguments and also where indicated it applies bit-wise on binary representations.

Several moduli are used. One is p, a public prime, such moduli being well known in the cryptographic art, with a corresponding publicly agreed primitive element g. For cooperation between the preferred embodiments of FIG. 2 and FIG. 4, some restrictions on p and g may be imposed or other suitable groups used, as will be described later. Also, each of Z, T, and W have their own RSA modulus, shown as ZN, TN, and WN, respectively, such moduli being well known in the art, as first proposed in "A method for obtaining digital signatures and public-key cryptosystems," by Rivest, Shamir and Adleman, in Communications of the ACM, February 1978, pp. 120–126. The public exponents of Z, T, and W are e, e', and e'', respectively; the corresponding private exponents of Z, T, and W are d, d', and d'', respectively. Some special restrictions are placed on WN for the purposes of the preferred embodiment of FIGS. 8 and 9, as will be detailed later. Three well known functions, bit extraction, Jacobi symbol, and quadratic residuosity, denoted B, J, and Q, respectively, are described and used later.

Turning now to FIG. 2, the first part of a flowchart for the preferred embodiment will now be described in detail.

Box 201 shows T choosing x from the interval 1 to $p-1$ uniformly and at random, such random selection as already mentioned. Then T raises g to the x power modulo p, such exponentiation as already described. The resulting residue is then called message [21]. As per the definition of the notation already described, message [21] is then sent from T to C.

Box 202 indicates that, after receiving message [21], C first chooses b at random uniformly from the interval 1 to ZN and then chooses y independently and uniformly from the interval 1 to $p-1$. Then b is sent to T as message [22.1] and y is sent to T as message [22.2].

Box 203 describes first how the value of message [23] is calculated by T. While the order of computation is not essential, as will be mentioned later, a particular order is used in these descriptions for clarity of presentation. First message [22.2] received is saved under the symbolic name y', and will be referenced again in box 403. Then the product of x and y' is formed modulo $p-1$, such calculation in the exponent is modulo $p-1$, which is more generally the order of the group, as is well known in the art. Then g is raised modulo p to the resulting power. Next the one-way function f already mentioned is applied to the result, yielding an intermediate result that may be called temp for purposes of this description. Next a "blinding factor" is computed as [22.1] received raised to the e, modulo Z's RSA modulus ZN. Then the product of this blinding factor and temp is formed modulo ZN and f is applied to the result. The result of this application of f is then the base in an exponentiation to T's secret RSA exponent d' modulo T's RSA modulus TN. This yields the final value of message [23]. As would be obvious to those of ordinary skill in the art, this application of f and raising to a secret RSA exponent is just an RSA public key digital signature, and any other equivalent digital signature technique or the like might be applied equally well here, the present choice being made only for concreteness and clarity. At last this value of message [23] is sent by T to C.

Box 204 defines the actions of C after receipt of message [23]. First message [21] is raised to the y power modulo p and the result is denoted as q, which C will also use in box 404 and 504. Next, b is raised to the e power modulo Z's RSA modulus ZN. The result is multiplied modulo ZN by f applied to q, which yields the final value of message [24.1]. Message [24.2] is then formed merely as a copy of message [23] received by C. Now messages [24.1] and [24.2] are tested. This is accomplished by raising message [24.2] to the e' power modulo TN, i.e. the public exponent corresponding to d' in T's RSA system, and testing whether the result is equal to f applied to message [24.1]. If the test is satisfied, the protocol proceeds, as mentioned earlier. The remainder of this box entails C sending the two messages already formed in this box, message [24.1] and message [24.2], to Z.

Box 205 denotes the first and only actions by Z in this flowchart. Initially Z tests message [24.1] and message [24.2] received just as C did: message [24.2] is raised to the e' power modulo TN and the result is tested for equality with that of applying f to message [24.1]. In the case when the test is satisfied, message [25] is formed as message [24.1] raised to Z's secret RSA signing exponent d modulo ZN. Finally, this message [25] is sent by Z to C.

Box 206 is first the checking of message [25] received by C. This is accomplished by raising message [25] to the public exponent e modulo ZN and comparing the result for equality with message [24.1]. Also shown here is the saving under the symbolic name q*, used later in box 404 and 504, of message [25] times the multiplicative inverse of b all modulo ZN, which is the unblinded form of the signature given by Z in message [25].

Turning now to FIG. 3, the second flowchart for part of the preferred embodiment will now be described in detail.

Box 301 begins the setup for the challenge/response between T and W. First C creates j and k independently but uniformly at random from a suitable interval. This interval is preferably from 0 to one less than some suitably large power of 2: the power of 2 requirement is believed to give each bit of j and k an independent and uniform distribution; the suitably large size is needed both to provide enough bits (n, as will be mentioned) for use in the protocol and enough to allow the one-way function to have a large enough domain. Then C sends the image of j under the one-way function f to T as message [31.1]. Also, C sends the image of k under f to W as message [31.2].

Box 302 shows that W forms challenge c independently and uniformly from the interval 0 to $2^n-1$, where the power of 2 requirement is for the same reasons as mentioned in box 301, and only n bits are required by the protocol. Naturally, each bit of c could be thought of as being generated as it is needed, however, this pre-generation provides some consistency with the needs of T, as will be described, and is used here for clarity. Message [31.1] is also received before T proceeds further.

Box 303 is the pre-creation by T of the n response bits that comprise r. Thus r is chosen uniformly from the interval 0 to $2^n-1$. Pre-choice of these bits is desired since the amount of work to be performed by T in responding to each challenge bit below is preferably minimized, as has been mentioned. Message [31.2] is also received before W proceeds further.

Boxes 304 through 307 represent a loop that is repeated n times. Thus each of the four boxes is visited in the order presented in the first iteration, then each of the four are visited in the same order in the second iteration, and so on until the n'th iteration, during which each of the four is visited in the same order but for the last time. The iteration number appears to the right of the decimal point in the messages sent by these four boxes; thus, message [32.i] stands for n different messages, one per iteration. In the detailed description of each of these four boxes that follows, only the operations for the i'th iteration are described.

Box 304 is merely the sending of the i'th bit of the challenge c as message [32.i] to C by W.

Box 305 shows the reception of message [32.i], its exclusive-or'ing with the i'th bit of k, denoted $k_i$, to form message [33.i]. This message is then sent from C to T.

Box 306 indicates that after T receives [33.i], the i'th bit of r, $r_i$, is forwarded to C in message [34.i].

Box 307 describes how C transforms [34.i], by exclusive-or'ing it with $j_i$. The result, [35.i], is then sent as a message to W.

There is preferably timing means or steps not shown for clarity, but readily conceived by those of ordinary skill in the art, which allow W to measure with sufficient accuracy the time between the sending of a [32.i] and the receipt of the corresponding [35.i]. It is preferred that the method or means whereby message [35.i]'s result from message [32.i]'s be as fast as possible so that the measured delay reflects primarily the physical distance of communication from W to T, as earlier mentioned. The processing of messages [32.i] and [34.i] involve only a single exclusive-or operation to be performed by C, and that for [33.i] and [35.i] by T and W, respectively, is essentially nothing, thus keeping the processing requirements for these messages only a few gate delays above zero.

Another aspect of timing relates to inflow and outflow protections. As will be appreciated, small variations (jitter) in the exact timing of each challenge or response bit might leak information from W or from T. An exemplary solution is for a clocking speed and response delay to be fixed a priori. Thus, C sends bits at this rate to T (to prevent inflow) and provides response bits to W at this same rate but phase shifted by a fixed amount (to prevent outflow). If C does not receive a bit from T or W in time, then C replaces the missing bit(s) with random bits and regards the protocol as having failed because of the improper response of that party.

Box 308 begins the post-processing for the neutralized challenge response sequence just described. The purpose of this processing is for each of C, T, and W to arrive at the same value, called m, m', and m'', respectively, to be used later as will be described. At this point, C is already able to determine m as follows: First a value called for convenience here temp1 is formed as the bitwise exclusive-or of message [32] and k. In other words, for all i between 1 and n, the i'th bit of temp1 is the exclusive-or of [32.i] and $k_i$. A value temp2 is formed in a similar way from [34] and j, that is temp2 is the bitwise exclusive-or of [34] and j. Then temp2, taken as an integer, is multiplied by $2^n$ and the result is added as an integer with temp1 treated as an integer. This final sum is m. Thus, the low-order n bits of m are the bitwise sum of [32] and k, and the next higher order n bits are the bitwise sum of [34] and j. While this technique for forming m from the two n bit sequences is arbitrary, it is presented here for concreteness. The final part of this box shows C sending j to T as message [36.1] and k to W as [36.2].

Box 309 is the checking of [36.1] received and the forming of m' by T. The checking is by applying f to [36.1] and making sure that the result is equal to [31.1]. The forming of m' is essentially the same as that detailed in box 308 above for m, except that T only knows the bitwise sum, called temp1 above, instead of the actual components, c and k, of it known to C. Thus, the bitwise sum of r and [36.1] is formed, this is multiplied by $2^n$ as an integer, and the result is added as an integer to [33], giving the result m'.

Box 310 describes the checking of [36.2] received and the forming of m", both in a way similar to that of box 309. The checking is performed by ensuring that f of [36.2] is equal to [31.2]. The forming of m" proceeds by computing temp1 as the bitwise exclusive-or sum of c and [36.2], and then adding this temp1 as an integer to the integer product of [35] and $2^n$.

Turning now to FIG. 4, the third flowchart for part of the preferred embodiment will now be described in detail.

Box 401 indicates how T creates a u uniformly between 1 and p−1, raises g to this power modulo p, and forwards the result to C as message [41].

Box 402 then defines how, after receiving [41], C chooses v uniformly and at random from the interval 1 to p−1 and returns this value to T in message [42].

Box 403 shows how T computes a number s and forwards it to C. First a temporary result, z, is calculated as a power of g modulo p. The exponent of g used to form z is the product of u and message [42] received; since arithmetic with such exponents is modulo p−1, as is well known in the art, the integer product of u and [42] may first be reduced modulo p−1 before it is used as a power of g modulo p. Similarly, because the value s that is calculated next by T is ultimately going to be used as an exponent in modular p exponentiation, all the arithmetic used to compute it can also be modulo p−1. First the product of x, y', and z is formed and subtracted from m', (from FIG. 3) giving a result that may be called temp1. Then the product of u and [42] is formed and its multiplicative inverse modulo p−1 is taken, yielding temp2. Finally, the modulo p−1 product of temp1 and temp2 is the value of s, which is sent by T to C as message [43].

Box 404 first defines the checking and forwarding of s and [44.1], which is message [41] raised to the v modulo p. Thus [44.1] should be the same as z. For notational clarity, [43] is shown also as [44.2]. The checking of s proceeds as follows: First g is raised to the m (from FIG. 3) power modulo p and may be saved as temp1. Then q is raised to the [44.1] power modulo p, even though [44.1] itself is the result of an exponentiation, and would thus normally appear only in the base, its "least positive representative" or representation as residue or integer is used here in the exponent, with the result saved as temp2. Next [44.1] is raised to the [44.2] power modulo p, with the result called temp3. Finally, temp1 is compared to the modulo p product of temp2 and temp3. In the case when the check is satisfied, [44.1] and [44.2] as already described are forwarded by C to W. This box 404 also includes the forwarding of q and its signature q* to W. In preparation, [44.3] is set to the value q already described in box 204, and [44.4] is set to the value of q* as as described in box 206. Finally, [44.3] and [44.4] are sent by C to W.

Box 405 shows how W is able to test messages [44.1] and [44.2] received in essentially the same way as C did in box 404: First g is raised to the m" (from FIG. 3) power modulo p and may be saved as temp1. Then [44.3] is raised to the [44.1] power modulo p, with the result saved as temp2. Next [44.1] is raised to the [44.2] power modulo p, with the result called temp3. Finally, temp1 is compared to the modulo p product of temp2 and temp3. Then box 405 shows how the messages [44.3] and [44.4] are checked by W: [44.4] is raised to the power e modulo ZN and the result is compared for equality with that of applying f to [44.3].

Turning now to FIG. 5, the fourth flowchart for part of the preferred embodiment will now be described in detail.

Much of the arithmetic shown in FIG. 5 is preferably performed in a group of prime order, and it will be described using such a group for clarity. One example of a suitable such group of prime order is the group of squares modulo a prime p with p−1=2p' where p' is prime. It is well known in the art how to test an element modulo p to determine if it is a square, such as by using the Jacobi symbol test mentioned later. It is also known how to convert an element that is not a square into a square by shifting the bits and changing a few low-order bits until it is a square (as detailed in "Digitalized signatures and public-key functions as intractable as factorization," by M. O. Rabin, as MIT technical report MIT/LCS/TR-212, January 1979) or by simply taking the convention that all such conversion entails squaring the number to be converted. Another similar group is that comprised of integers between 1 and p' where the group operation is multiplication modulo p but with the result "normalized" to the least positive representative of the product or the least positive representative of the the additive inverse modulo p of the product, whichever is less. Conversion to this group is trivially accomplished by normalizing. Other suitable groups of prime order quite well known in the art are $GF(2^n)$ where $2^n-1$ is a prime. This group could of course have been used instead of the integers modulo p for FIG. 2 itself, thereby requiring no normalization or conversion. But for generality, the following description will include explicit reference to the group of order p' and will indicate when conversion may be required.

Box 501 shows T forming message [51] as m' (from FIG. 3) raised to the x (from FIG. 2) power in the group of order p'. First m' should of course be normalized into the group of order p' if it is not a member of the group already. Then message [51] is sent to C.

Box 502 indicates first how C chooses u and v independently and uniformly from the interval 1 to p'. Then message [52] is shown formed as message [51] received raised to the u power times message [21] (from FIG. 2), translated into the group of order p' if necessary, raised to the v power, all in the group of order p'. Then message [52] is transmitted to T.

Box 503 depicts the transformation of message [52] received and the return of the result to C. First message [52] is raised to the multiplicative inverse of x modulo p'. Then this becomes the value of message [53] which is sent to C.

Box 504 illustrates the testing of the message [53] received and the forwarding to W of a responsive message as well as two messages from FIG. 2. The testing is for equality between message [53] and the result of raising m to the power u times g to the power y, all in the group of order p'. When this is successful, message [54.1] is first formed by raising message [51] already mentioned as received to the power y (retained from FIG. 2) in the group of order p'. Then message [54.2] is formed by copying the value of q (retained from FIG. 2 and suitably translated to the group of order p' if necessary) and message [54.3] is formed by copying the value of q* (also retained from FIG. 2). Finally, these three messages formed are sent to W.

Box 505 defines the testing of messages [54.2] and [54.3] received and the formation of a challenge message [55]. The testing is accomplished by raising message [54.3] to the e power modulo ZN and comparing the result for equality with the image of message [54.2] under f. When the equality holds, u' and v' are chosen independently and uniformly from 1 to p'. Then message [55] is formed as the product of message [54.1] received raised to the u' power times message [54.2] raised to the v' power, all in the group of order p'. Then this message is communicated to C.

Box 506 details how C transforms the challenge message [55] received before forwarding it on to T. First C chooses w uniformly and independently from the interval 1 to p'. Then message [56] is formed by raising message [55] to a power in the group of order p'. This power is formed as the product of w times the multiplicative inverse of y, all modulo p'. Then message [56] is provided to T.

Box 507 specifies how message [56] received is transformed and returned to C by T. Message [56] is first raised to a power in the group of order p'. The power is the multiplicative inverse of x modulo p' already mentioned. The result of this exponentiation is then returned to C in message [57].

Box 508 depicts a transformation of message [57] received by C and the forwarding of the result to W. Message [57] is raised to a power in the group of order p' that is the multiplicative inverse of w modulo p'. This power is then provided to W in message [58].

Box 509 is the checking by W of message [58] received. The value of message [58] expected is formed as the product of raising m" (form FIG. 3) to the u' power and raising g to the v' power. If the result is equal to message [58] received, then W completes with success, otherwise with failure.

Turning now to FIG. 6, the fifth flowchart for part of the preferred embodiment will now be described in detail.

Box 601 shows how T first forms r uniformly at random from the interval 1 to ZN−1. Then T raises r to the power e modulo ZN (encryption with Z's public key as already mentioned), applies f to the result, and sends the resulting image under f to C as message [61].

Box 602 expresses how C first creates a random value r' independently and uniformly from the interval 1 to ZN−1. Message [61] from T is expected at this point. When this message is received, C raises the value of r' to the e power modulo ZN and sends the result to T as message [62].

Box 603 indicates how T then forms two messages responsive to message [62] received from C. First T obtains the value r raised to the e power modulo ZN as already mentioned. This value is transmitted to C as message [63.1], only after message [62] has been received as mentioned. The value of r raised to the e is also multiplied by message [62] and m' (from FIG. 3) modulo ZN, f applied to the result, and the result of that raised to the d' power modulo TN (i.e. signed by T). This is then sent to C as message [63.2].

Box 604 illustrates two tests performed by C on the messages received and two responsive messages sent to Z. First is the test that message [63.1] already received is the image under f of the value of message [61] received, which is accomplished by testing the result of applying f to message [61] for equality with message [63.1]. Once this test is positive, the signature contained in message [63.2] received is tested as follows: message [63.2] is raised to the power e' modulo TN and the result is compared for equality with the image under f of the product modulo ZN of m', message [63.1], and the e' power of r'. After this test is satisfied, message [64.1] is formed as the the modulo ZN product of m', message [63.1], and r' raised to the e power. Message [64.2] is formed as a copy of message [63.2]. Finally, messages [64.1] and [64.2] are sent to Z.

Box 605 shows how Z first checks these two messages. Message [64.2] received is raised to the e' power modulo TN and the result tested for equality with the image of received message [64.1] under f. After there is equality, message [65] is formed as message [64.1] raised to the d power modulo ZN. This message is then sent to C.

Box 606 specifies how C tests this message from Z and forwards a resulting message to T. The signature of Z on message [65] received is tested by raising this message to the e power modulo ZN and testing for equality with the product modulo ZN of: m; message [63.1]; and r' raised to the power e. Upon confirmation of the equality, message [66] is formed by "dividing r' out" of message [65]: message [65] is multiplied by the multiplicative inverse of r' modulo ZN. The resulting message [66] is then supplied as input to T.

Box 607 details testing and extraction of the result of message [66] received by T. Message [66] is raised to the e power modulo ZN and the result is tested for equality with the result of multiplying m by r raised to the e power modulo ZN. The equality holding, m* is formed from message [66] with the factor r "divided out" by multiplying with its multiplicative inverse modulo ZN.

Turning now to FIG. 7, the sixth flowchart for part of the preferred embodiment will now be described in detail.

A function denoted B is used here to return a particular bit of its argument, which is preferably a so called "hard" bit with respect to the oneway function f used here.

Box 701 indicates how T forms a uniformly at random from the interval 1 to ZN−1. Then T forms message [71] as a raised to the power e modulo ZN, and sends it to C.

Box 702 shows W first forming c uniformly at random from some suitable public interval, taken as 1 to ZN−1 for clarity. Then W sends the image of c under f to C as message [72].

Box 703 details how C forms two values at random and sends two responsive messages to W. The first value formed is shown as a' which is chosen independently and uniformly from the interval 1 to ZN−1. The second is c' chosen as c was, uniformly from 1 to ZN−1. Then message [73.1] is formed as the product modulo ZN of message [71] received and a' raised to the e power. Also message [73.2] is formed to contain c'. Message [72] must be received before both messages [73.1] and [73.2] are sent to W.

Box 704 depicts the sending of c by W to C as message [74], which is accomplished only after receipt by W of messages [73.1] and [73.2].

Box 705 illustrates the testing by C for consistency of the two messages sent by W, and the forming a resulting message sent to T. First f is applied to message [74]

received and the result is compared for equality with message [72], receipt of which was already mentioned. When they are equal, message [75] is formed by applying the bit extraction operation B to the value of message [74] and exclusive-or'ing the resulting bit with the bit yielded by applying the bit extraction operation to c'. Then message [75] is sent to T.

Box 706 is where T uses the signature on m* retained from FIG. 6 to form a response based on the challenge bit contained in message [75] received. The value m* is raised to the message [75] power (i.e. changed to zero if [75] is zero and left unchanged otherwise) and multiplied modulo ZN by a to form message [76] that is sent to C.

Box 707 details the testing of message [76] received and the formation and sending of a response to W. First message [76] is raised to the power e modulo ZN and the result is compared for equality with a product modulo ZN. One term of this product is message [71] already mentioned as received. The other term is m raised to a binary power that is the exclusive-or of the bit extraction function B applied to message [74] already mentioned as received and the bit extraction function applied to c'. When this test completes successfully, message [77] is formed as the product of message [76] and a' modulo ZN, and is sent to W.

Box 708 depicts the testing of the three messages sent by C to W, and to give W confidence in T's possession of m*. First message [77] received is raised to the e power modulo ZN. Then this is compared for equality with a product modulo ZN of message [73.1] received and m" raised to a binary power. This binary power is the exclusive-or of the bit extraction function applied to c with the bit extraction function applied to message [73.2].

Turning now to FIG. 8, the seventh flowchart for part of the preferred embodiment will now be described in detail.

As already mentioned, WN will be a composite created by W. For convenience and clarity, it will be taken to have exactly two prime factors, each congruent to 3 modulo 4, which are known to W and at least not to C. While it may be unnecessary in some applications, it is well known in the art how W could convince anyone that WN was chosen in this way, as described for instance by Peralta and van de Graaf, "A simple and secure way to show the validity of your public key," in Proceedings of CRYPTO 87, C. Pomerance Ed., Springer Verlag 1988. It will also be necessary for t to be a non-square residue with Jacobi symbol 1, for which $-1$ is believed suitable. A function shown as J is used to indicate the Jacobi symbol computation, which is widely known in the art, and detailed for example in "A method for obtaining digital signatures and public-key cryptosystems," by Rivest, et al, as already cited. It only requires its argument and WN and returns $-1$ if the Legendre symbols of its argument modulo the two factors of WN differ and 1 if they are the same (assuming as usual that the argument is coprime with WN). Also, a function shown as Q is used by W to determine the quadratic residuosity modulo WN of its argument, with the result defined here to return 1 when the Legendre symbols of its argument modulo each of the two factors of WN are 1 and $-1$ otherwise. It is also well known in the art how to compute this function, such as by, for example, using the Jacobi symbol algorithm already mentioned as a way to evaluate each Legendre symbol.

Box 801 indicates how T creates an s uniformly between 1 and WN $-1$, squares it and multiplies the result by t raised to the b power, all modulo WN. The result is sent to C as message [81]. The value b is the single bit that T wishes to provide to W, i.e. b is either a 0 or 1 that is to be kept form C during the protocol which provides it to W. Notice that b is encoded as the quadratic residuosity of message [81], but that the Jacobi symbol of that message is 1.

Box 802 shows C first checking that message [81] received has, with respect to WN, Jacobi symbol 1. Then C is shown creating s' independently and uniformly from the interval 1 to WN $-1$ and providing it to T as message [82].

Box 803 indicates how T forms and sends message [83] to C. The same computation for box 801 is performed (or retained) and the result is multiplied modulo WN by the square of message [82] received. Then f is applied to the result before T signs it by raising it to T's secret signing exponent d' modulo TN. Ultimately, this result is supplied to C as message [83].

Box 804 describes first the testing of messages [81] and [83] received by C. Message [83] is raised to the e' power, modulo TN, and the result is tested for equality with f applied to the product modulo WN of message [81] and the square of s'. When the test is satisfied, message [84.1] is first formed as the product of message [81] and s' squared, modulo WN. Then message [84.2] is formed as a copy of message [83] already received. Finally, messages [84.1] and [84.2] are sent by C to W.

Box 805 illustrates how W first checks these two messages received and then determines the bit sent by T. The check is performed by raising message [84.1] to the power e' modulo TN and comparing the result for equality with the result of applying f to message [84.1]. If this test is passed, then W determines the bit sent by T shown as b''' as the quadratic residuosity of message [84.1] modulo WN. In other words, W gets T's bit by using its knowledge of the factorization of WN mentioned above to determine whether or not message [84.1] is a square modulo WN. This is shown using the function Q, which should return in this case the value of b that T encoded in the message [81].

Turning now to FIG. 9, the eighth flowchart for part of the preferred embodiment will now be described in detail.

Box 901 shows first how T creates s uniformly at random from 1 to WN $-1$. Next T creates a independently and uniformly as a bit, i.e. 0 or 1. Then T forms message [91] as the product of s squared and t to the a, all modulo WN. This message is then sent to C.

Box 902 indicates first how C checks the Jacobi symbol of message [91] received from T, to ensure that it is 1. If it is, then C creates s' uniformly and at random from the interval 1 to WN $-1$. Also, C creates a random bit a' uniformly as 0 or 1. Then C sends each of these, as messages [92.1] and [92.2], respectively, to T.

Box 903 illustrates how T forms and sends a signature responsive to messages [92.1] and [92.2] received. First a product, modulo WN, is formed from the following three terms: the square of s; message [92.1] squared; and t raised to a power that is the sum of a and message [92.2]. Then f is applied to the sum and the result is raised to the d' power modulo TN. This resulting signature is message [93] that is sent to C.

Box [904] defines the testing by C of the input messages [91] and [93] received from T and the creation and sending of two resulting messages to W. First message

[93] is raised to the e' power modulo TN and the result compared for equality with the result of applying f to a product modulo WN of the following three terms: message [91]; s' squared; and t raised to the a' power. When this test succeeds, message [94.1] is formed as the product modulo WN of the same three terms used above: message [91]; s' squared; and t raised to the a' power. Then message [94.2] is formed as a copy of message [93]. Finally, these two messages, [94.1] and [94.2], are sent to W.

Box 905 details how W tests messages [94.1] and [94.2] received from C and then produces two messages that are returned to C in response. First the signature is checked by applying the public exponent of T, shown as e', to message [94.2] modulo TN and testing the equality of the result with the image of message [94.1] under f. Then the value denoted a" is formed as the quadratic residuosity of message [94.1], defined by Q ([94.1]), exclusive-or'ed with b', which is the bit W wishes to send to T without C learning it. Message [95.1] is then computed as the product of message [94.1] times t raised to the a" power modulo WN; f is applied to the result; and the resulting image is raised to the d" power modulo WN. Then messages [95.1], as just described, and message [95.2] which has value a", as already described, are sent to C.

Box 906 defines the testing of messages [95.1] and [95.2] received by C from W and the resulting two messages sent to T. The testing is accomplished by checking the equality of message [95.1] raised to the e" power with the image of f on a product modulo WN. This product comprises message [91], s' squared, and t raised to a power that is the sum of a' and message [95.2]. If the test is satisfied, message [96.1] is taken as a copy of message [95.1] and message [96.2] as a copy of [95.2]. These are the two messages sent to T.

Box 907 expresses how T first tests the two messages received, [96.1] and [96.2], for consistency with the messages already received and then determines the result of the bit sent by W. The test of W's signature begins by raising message [96.1] to the e" power modulo WN and testing the equality of the result with the image under f of the product of three terms: the skier of s; message [92.1] squared; and t raised to the sum of a, message [92.2], and message [96.2]. When the test is satisfied, T is finally able to compute the bit b" sent by W as the exclusive-or of a, message [92.2], and message [96.2].

As is well known to those of ordinary skill in the art, there are many essentially equivalent orders to evaluate expressions; ways to evaluate expressions; ways to order expressions, tests and transmissions within flowchart boxes; ways to group operations into flowchart boxes; and ways to order flowchart boxes. The particular choices that have been made here are merely for clarity in exposition. Notice, for example, that the time ordering of the protocol parts shown in FIGS. 2-9 are not necessarily sequential; for example, it is not until box 405 that the values [44.1] through [44.4] are needed by W. Thus, FIG. 2 and FIG. 3 could be carried out in either order, or even concurrently, so long as these values are ultimately checked by W.

It will also be obvious to those of ordinary skill in the art how parts of the inventive concepts and protocols here disclosed can be used to advantage without necessitating the complete preferred embodiment. This may be more fully appreciated in light of some examples. If Cs are not to be provided with inflow protection, as already described, then k is not needed and Z could provide signatures or the like directly to T by encrypting them for secrecy with a public key of T. If the computation time for T can be bounded with sufficient accuracy, perhaps because of an internal clock, then a simpler cryptographic challenge response protocol, as already mentioned, could be used instead of the preferred bit-at-a-time technique (Naturally, if C is required to make make significant computations for the response, then the accuracy is further degraded, since a faster C could always be substituted.); and if proximity detection itself is not to be provided, then of course the bit-at-a-time technique can be dropped in favor of just sending all of message [32] through [35] as single blocks. Even if untraceability is to be completely sacrificed, and blind signatures unused, there may still be advantages: C may be able to check each signature issued by T; the bit-at-a-time proximity check can operate, but without the need for j and k; and various advantages of a C already mentioned apply.

Certain variations and substitutions may be apparent to those of ordinary skill in the art. For example, in the protocol of FIG. 3, W need not wait until a [35.i] is received before sending out further [32.i], it is sufficient for W to bound the time delay for corresponding challenges and responses. Another example is that almost any kind of digital signature could be used instead of RSA for messages such as [23], [63.2], [83]. In fact, the term "digital signature" is used here to broadly include public key digital signatures proper, undeniable signature schemes, and protocols for establishing that one party has a verifiable secret. A further example is that a type of signature scheme other than the ElGamal scheme, already mentioned, could be used for the signatures contained in [44.1] through [44.4], so long as its public keys and signatures can be neutralized.

While these descriptions of the present invention have been given as examples, it will be appreciated by those of ordinary skill in the art that various modifications, alternate configurations, and equivalents may be employed without departing from the spirit and scope of the present invention.

What is claimed is:

1. Apparatus for conducting cryptographic transactions comprising:

first information processing means that is in the possession of an individual, that is tamper-resistant, and that includes memory means inaccessible to the individual;

second information processing means that is under the control of said individual;

interface means between said first information processing means and said second information processing means for allowing information interchange therebetween;

key creation means for a first party to create a first private key and a corresponding first public key and to supply the first public key to a second party through said interface means;

neutralizing value creation means for said second party to create a neutralizing value at least unpredictable to said first party;

neutralizing means for said second party to determine a second public key responsive to said first public key and said neutralizing value such that for said first public key there exists at least one said neutralizing value that would determine each said second public key; and secret key determining means for deriving a secret key, by said first party, necessary for making digital signatures verifiable with said second public key.

2. A cryptographic method wherein a first party communicates with a second party to create a neutralized public key and corresponding private key, comprising the steps of:

creating a first secret key unknown at least in part to said second party and a corresponding first public key, by a first party;

supplying to said second party, by said first party, a first message as a function of said first public key;

receiving and retaining said first message, by said second party;

developing a neutralizing value at least unpredictable to said first party, by the second party;

determining a second public key as a function of said first public key and said neutralizing value, by at least said second party, such that for said first public key there exists at least one said neutralizing value that would determine each said second public key; and determining a second secret key, by said first party, necessary for making digital signatures verifiable with said second public key.

3. Apparatus for conducting cryptographic transactions comprising:

first information processing means that is in the possession of an individual, that is tamper-resistant, and that includes memory means inaccessible to the individual;

second information processing means comprising a system that is external to said first processing means and beyond the control of said individual;

third information processing means that is under the control of said individual;

first interface means between said first information processing means and said third information processing means for allowing information interchange therebetween;

second interface means between said second information processing means and said third information processing means for allowing information interchange therebetween;

public key digital signature forming means, at least partly within said first information processing means, for developing at least part of a digital signature, as a function of private key information within said information storage means, and for providing an at least partial digital signature to said third information processing means through said first interface means;

public key digital signature checking means for said third information processing means to check said at least partial digital signature received through said first interface means and to forward a digital signature, which the partial digital signature received is necessary to form, to said second information processing means through said second interface means; and public key digital signature checking means for said second information processing means to check a digital signature that is received through said second interface means.

4. A cryptographic method wherein a first party communicates with a second party only via a third party and the first party having a first private key and the second party having a second private key and the public keys corresponding to the first and the second private keys being known to the three parties, the method comprising the steps of:

creating a blinding valve unpredictable to at least said first and second party, by said third party;

blinding an original message at least responsive to said blinding value to produce a blinded message such that a blinded message can result from any original message for at least one such blinding value;

signing said blinded message using said first private key to form a corresponding first public key digital signature, by said first party, and supplying this first signature to said third party;

verifying said first signature received, by said third party, using said first public key and supplying the first signature to said second party;

verifying said first signature received, by said second party;

signing said blinded message to form a signed blinded message, by said second party, by using said second private key to form a corresponding second public key digital signature and forwarding this second signature to said third party; and unblinding said second signature received as a function of said blinding value to develop an unblinded signed message, such that said unblinded signed message and said signed blinded message are substantially unlinkable to each other because at least one particular said blinding value would imply that many different pairs of blinded and unblinded forms correspond.

5. The method of claim 4, further comprising the steps of forming said message to contain a public key by cooperation of said first and third parties, such that (a) cooperation of at least said first party is necessary to form digital signatures verifiable using said public key, and (b) said third party is able to influence the public key to take on many different values.

6. The method of claim 5, including the step of checking said message and said blinding, by said first party, before providing said first signature to said third party.

7. Apparatus for permitting cryptographic communication between first and second parties only if the distance from a first party to a second party is below an upper bound, said apparatus comprising:

selection means for forming a response value by said first party at least unpredictable to an adversary;

selection means for forming a challenge value by said second party at least unpredictable to an adversary;

challenge issuing means for said second party to issue said challenge to said first party;

response issuing means for said first party to issue said response to said second party upon receiving said challenge without substantial delay;

measuring means for said second party to determine the time elapsed between the issue of said challenge and the receipt of said corresponding response;

signing means for said first party to issue a public key digital signature depending on both said challenge and said response; and signature checking means for said second party to check said public key digital signature.

8. A method for permitting cryptographic communication between first and second parties only if the distance from a first party to a second party is below an upper bound, said method, comprising the steps of:

forming a challenge, by a second party, in a way unpredictable to at least a third party;

forming a response, by a first party, in a way unpredictable to at least a third party;

issuing said challenge, by said second party;

issuing said response to said second party upon receiving said challenge without substantial delay, by said first party;

measuring the time elapsed between the issue of said challenge and the receipt of said corresponding response, by said second party;

issuing a public key digital signature responsive to both said challenge and said response, by said first party; and checking said public key digital signature by said second party.

9. A method for permitting cryptographic communication between first and second parties only if the distance to a first party by a second party is below an upper bound, in which a third party is allowed to prevent outflow from the first party to the second party, said method comprising the steps of:

creating a pad, by said third party, in a way at least unpredictable to said first party and unknown to said second party;

committing to said pad, by said third party, to said first party;

forming a challenge, by said second party, in a way unpredictable to said third party;

forming a response, by said first party, in a way unpredictable to said third party;

issuing said challenge, by said second party, in a way that it is transferred to said third party;

receiving said challenge, by said first party, and issuing said response to said third party upon receiving said challenge without substantial delay;

padding said response received, by said third party, by combining said challenge with said pad to form a padded challenge, and providing said padded challenge to said second party;

measuring the elapsed time between said issue of said challenge and receipt of said padded response, by said second party;

opening said commitment to said pad, by said third party, to said first party;

issuing a public key digital signature as a function of both said challenge and said padded response, by said first party; and checking said public key digital signature by said second party.

10. A method for permitting cryptographic communication between first and second parties only if the distance to a first party by a second party is below an upper bound, in which a third party is allowed to prevent inflow from the second party to the first party, said method comprising the steps of:

creating a pad, by said third party, in a way at least unknown to said first party and unpredictable to said second party;

committing to said pad, by said third party, to said second party;

forming a challenge, by said second party, in a way unpredictable to said third party;

forming a response, by said first party, in a way unpredictable to said third party;

issuing said challenge to said third party, by said second party;

receiving said challenge, by said third party, and padding said challenge by combining said challenge with said pad to form a padded challenge and forwarding said padded challenge to said first party;

receiving said padded challenge, by said first party, and issuing and transferring said response upon receiving said padded challenge without substantial delay to at least said second party;

measuring the elapsed time between said issue of said challenge and receipt of said response by said second party;

issuing a public key digital signature as a function of both said padded challenge and said response, by said first party;

opening said commitment to said pad, by said third party, to said second party; and checking said public key digital signature by said second party.

11. A cryptographic method wherein a first party communicates with a second party only via a third party and the first party having a private key and the corresponding public key known to the three parties, the method comprising the steps of:

forming a public key digital signature on the message at least by said first party using said private key, and the signature becoming known to said third party;

creating an obscuring value, by said third party, at least unpredictable to said first and second party;

obscuring said digital signature, by said third party, as a function of said obscuring value, so that many different forms of a signature verifiable with said public key and said message could be created by at least one obscuring value;

verifying said digital signature on said message by said third party using said public key and forwarding said digital signature to said second party; and verifying said digital signature received on said message, by said second party, using said public key.

12. A cryptographic method wherein a first party communicates with a second party only via a third party and the first party having a private key and the corresponding public key known to the three parties, the method comprising the steps of:

forming a signature on a message, by said first party, using said private key;

verifying said signature on said message, by said third party, using said public key by (a) forming a challenge from said signature, (b) providing said challenge to said first party, (c) receiving a corresponding response formed by said first party, and (d) checking said response;

providing said signature by said third party to said second party;

creating a challenge, by said second party, and providing the challenge to said third party;

disguising said challenge received by said third party and forwarding it to said first party;

forming a response, by said first party, to said disguised challenge received and forwarding the response to said third party;

un-disguising said response received, by said third party, and forwarding the resulting response to said second party; and verifying, by said second party, said resulting response received.

13. Apparatus for conducting cryptographic transactions comprising:
- first information processing means that is in the possession of an individual, that is tamper-resistant, and that includes memory means inaccessible to the individual;
- second information processing means comprising a system that is external to said first processing means and beyond the control of said individual;
- third information processing means that is under the control of said individual;
- first interface means between said first information processing means and said third information processing means for allowing information interchange therebetween;
- second interface means between said second information processing means and said third information processing means for allowing information interchange therebetween;
- public key digital signature forming means, within said second information processing means, for forming a digital signature on a blinded digital message, as a function of a private key accessible to said second information processing means, and for forwarding said signature to said third information processing means;
- public key digital signature checking means for said third information processing means to check said digital signature received through said second interface means as a function of a public key corresponding to said private key of said second party and for forwarding the digital signature to said first information processing means through said first interface means; and
- public key digital signature unblinding means for said first information processing means to unblind said digital signature received through said second interface means and said blinding, said unblinding and signing cooperating so that a digital signature by said second information processing means is inaccessible to said third information processing means and is obtained by said first information processing means.

14. A cryptographic method wherein a first party communicates with a second party only via a third party and the first party having a first private key and the second party having a second private key and the public keys corresponding to the first and the second private keys being known to the three parties, the method comprising the steps of:
- creating a first blinding value, by said first party, unknown at least in part to said third party;
- creating a second blinding value, by said third party, at least unpredictable to said third party;
- blinding a message by both said first party and said third party as a function of said first and second blinding values to produce a doubly-blinded message;
- signing said doubly-blinded message, by said first party, using said first private key to form a first signature and forwarding said first signature to said third party;
- checking said first signature received, by said third party, using said first public key and forwarding said first signature to said second party;
- checking said first signature received, by said second party, using said first public key;
- signing said doubly-blinded message, by said second party, using said second private key, to create a second signature and returning the second signature to said third party;
- checking said second signature received, by said third party; and
- unblinding said second signature by cooperation of said first and third party.

15. A cryptographic method wherein a first party communicates with a second party only via a third party and a public key is known to the three parties and the first party having a digital signature verifiable with the public key, the method comprising the steps of:
- creating a protector value having a signature unknown to said third party, by said first party, and providing the protector to said third party;
- sanitizing the protector received, by said third party, using a sanitizing value at least unpredictable to said first and second parties, so that many different sanitized protectors can result from any particular unsanitized protector, and providing the sanitized protector to the first party;
- creating a challenge at least unpredictable to said first and second party, by interchange between said first and third party, and supplying the challenge to said first party;
- forming a response to said sanitized challenge received, by said first and third parties, including checking the response by the third party and forwarding the response to the second party; and
- checking the response received, by the second party.

16. The method of claim 15, including the step of sanitizing the challenge in a way that is unpredictable to both said first and said third parties.

17. A cryptographic method wherein a first party communicates with a second party only via a third party and the first party having a first private key and the second party having a second private key and the public keys corresponding to the first and the second private keys being known to the three parties, the method comprising the steps of:
- encoding a message at least unknown to said third party and belonging to a strictly limited set of possible values, by said first party, using said second public key;
- hiding said encoded message with a value at least unpredictable to said first party, so that said message is not changed but many different hidden encoded messages containing the same message can result and providing the hidden encoded message to said first party;
- signing said hidden encoded message received, by said first party, using said first private key and providing the resulting signature to said third party;
- checking said signature received, by said third party, and forwarding the signature to said second party; and
- checking said signature received by said second party and decoding the message contained in said hidden form of said message by using said second private key, with the result that said message encoded by said first party is obtained by said second party.

18. A cryptographic method wherein a first party communicates with a second party only via a third party and the first party having a first private key and the second party having a second private key and the public keys corresponding to the first and the second private keys being known to the three parties, the method comprising the steps of:

encoding a first element of a group in a first message, by said first party, using said second public key and forwarding the encoded first message to said third party, such that the first group element is at least unknown to said third party;

modifying said encoded first message received, by said third party, using a value at least unpredictable to said first party, so that many different modified encoded messages can result, in such a way that a second group element becomes known to the third party that when combined by a group operation with said first group element yields the group element encoded in said modified encoded message, and the third party forwarding said modified encoded message to said first party;

signing said modified message received, by said first party, using said first private key and providing the resulting first signature to said third party;

checking the first signature received, by said third party, using said first public key and forwarding the first signature to said second party;

checking said first signature received, by said second party, using said first public key and decoding the modified message contained in the signature using said second private key, with the result that said third group element is obtained by said second party;

forming a second digital signature and providing it to said third party, by said second party, the second signature encoding a fourth group element that when combined with said third group element using said group operation yields a fifth group element standing for a message the second party provides to the first party;

checking said second public key digital signature received, by said third party, and forwarding the second signature to said first party; and checking said second public key digital signature received, by said first party, and recovering said fifth group element as the result of applying said group operation to said first and second group elements and to said fourth group element.

* * * * *

UNITED STATES PATENT AND TRADEMARK OFFICE
CERTIFICATE OF CORRECTION

PATENT NO.       : 4,926,480
APPLICATION NO.  : 07/198315
DATED            : May 15, 1990
INVENTOR(S)      : David Chaum Page 1 of 1

It is certified that error appears in the above-identified patent and that said Letters Patent is hereby corrected as shown below:

On the Title Page:

Item (63) Related U.S. Application Data, please delete filing date for 07/123,703 listed as "10/23/1987" and substitute the filing date for 07/123,703 as --11/23/1987--.

Signed and Sealed this

First Day of September, 2009

David J. Kappos
*Director of the United States Patent and Trademark Office*